(12) United States Patent
Tsuruoka et al.

(10) Patent No.: US 6,343,146 B1
(45) Date of Patent: *Jan. 29, 2002

(54) IMAGE SIGNAL PROCESSOR APPARATUS FOR RESTORING COLOR SIGNALS AT HIGH DEFINITION BY USING IMAGE STRUCTURAL MODELS

(75) Inventors: Takao Tsuruoka, Machida; Taketo Tsukioka, Hachioji, both of (JP)

(73) Assignee: Olympus Optical Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/027,590

(22) Filed: Feb. 24, 1998

(30) Foreign Application Priority Data

Feb. 27, 1997 (JP) .............................. 9-058568

(51) Int. Cl.⁷ .................................... G06K 9/00
(52) U.S. Cl. ........................ 382/163; 382/167
(58) Field of Search ................. 382/163, 167; 358/518, 520, 525; 348/616, 638, 617, 642

(56) References Cited

U.S. PATENT DOCUMENTS 5,032,910 A * 7/1991 Cok .................... 348/392.1

FOREIGN PATENT DOCUMENTS

JP 5-56446 3/1993

* cited by examiner

Primary Examiner—Yon J. Couso
(74) Attorney, Agent, or Firm—Frishauf, Holtz, Goodman, Langer & Chick, PC

(57) ABSTRACT

An image signal processor includes an area extracting unit for extracting from an image signal color signals of a local area of a predetermined size which includes a desired pixel. A maximum variance signal selecting unit selects one of the color signals which exhibits a maximum variance over the average variance of the color signals in the local area. In a signal modifying unit, the shape of the other color signals than the selected color signal is modified so that their parameters are equal to the parameters of the selected color signal. In a candidate image generating unit, the other modified color signals and the selected color signal are combined together to generate a plurality of reference image candidates. A reference image selecting unit than selects as a reference image one of the reference image candidates on the basis of a given evaluation function. In a restoring unit, dropout color signals are then restored with the use of the reference image determined by the reference image selecting unit.

20 Claims, 17 Drawing Sheets

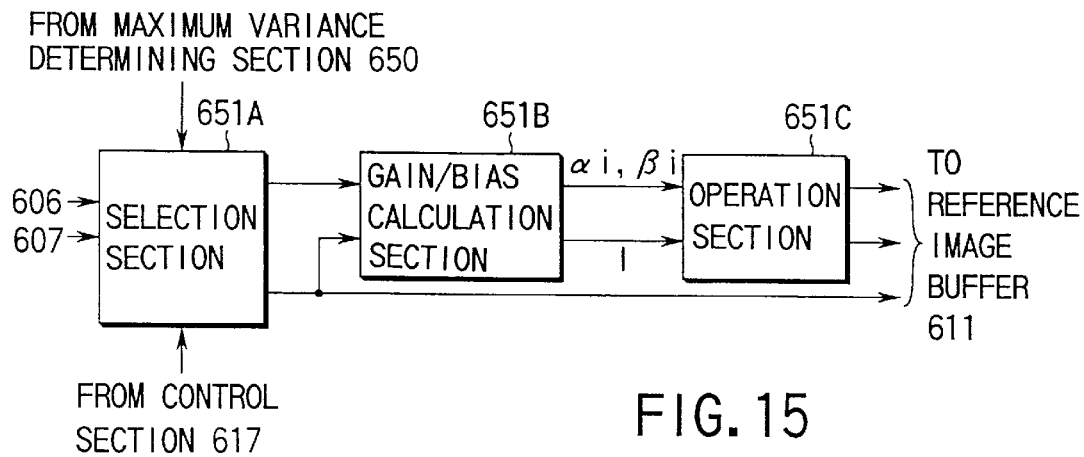
FIG. 15
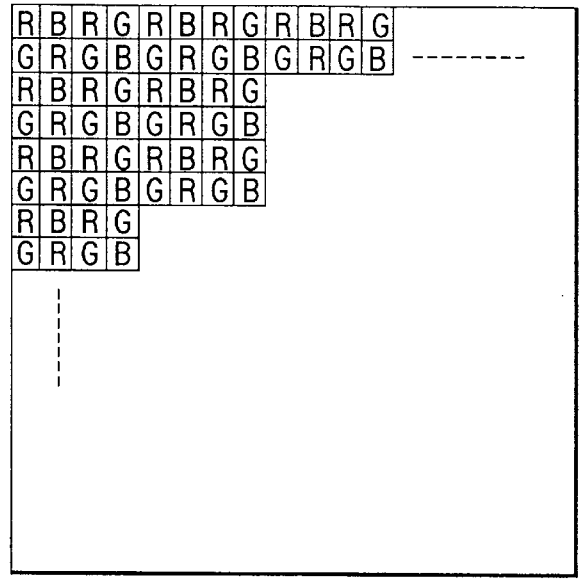
FIG. 16A
FIG. 16C
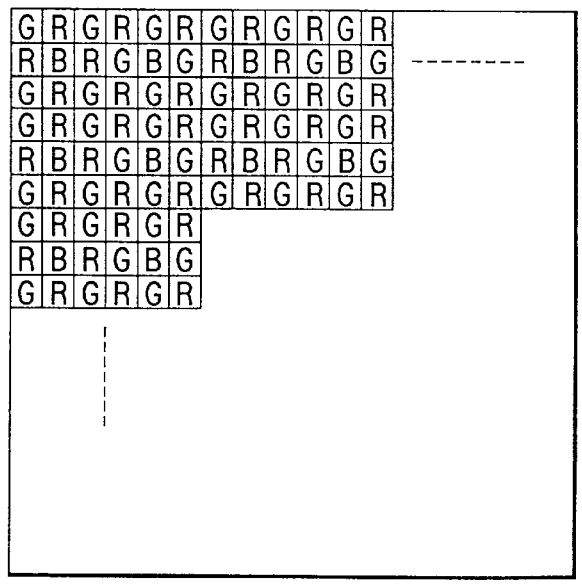
FIG. 16B
FIG. 16D

IMAGE SIGNAL PROCESSOR APPARATUS FOR RESTORING COLOR SIGNALS AT HIGH DEFINITION BY USING IMAGE STRUCTURAL MODELS

BACKGROUND OF THE INVENTION

The present invention relates to an image signal processor and an image input processor.

Recently, image input processors have widely been marketed using inexpensive, light-weight single CCD chips. In such an image input processor, color filters are arranged in a mosaic pattern on a light-sensitive area to acquire color information of an object from a single image pickup element.

Such color filters are illustrated, for example, in FIG. 19 where an array of complementary color mosaic filters including cyan (Cy), magenta (Mg), yellow (Ye), and green (G). It is assumed in FIG. 19 that the luminance signals and the chrominance signals corresponding to the n-th line and the (n+1)th line of an even-numbered field are $Y_{o,n}$, $Y_{o,n+1}$ and $C_{o,n}$, $C_{o,n+1}$, and the luminance signals and the chrominance signals corresponding to the n-th line and the (n+1)th line of an odd-numbered field are $Y_{e,n}$, $Y_{e,n+1}$ and $C_{e,n}$, $C_{e,n+1}$. Those signals are expressed by:

$$Y_{o,n}=Y_{o,n+1}=Y_{e,n}=Y_{e,n+1}=2R+3G+2B \quad (1)$$

$$C_{o,n}=C_{e,n}=2R-G \quad (2)$$

$$C_{o,n+1}=C_{e,n+1}=2B-G \quad (3)$$

Also, Cy, Mg, and Ye are expressed using three primary colors; green (G), red (R), and blue (B), by:

$$Cy=G+B \quad (4)$$

$$Mg=R+B \quad (5)$$

$$Ye=R+G \quad (6)$$

As apparent from Equation (1), the luminance signals are generated from all the lines of both even- and odd-numbered fields. On the other hand, the chrominance signals defined by Equations (2) and (3) are generated from every alternate line while signals of dropout lines are compensated by linear interpolation. Then, proper matrix operation produces three primary color, R, G, and B, signals. This method is however disadvantageous in that the chrominance signals carry ½ of information as compared with the luminance signals and severe artifacts such as color moiré may appear on the edge. It is known for attenuating such moiré effects to provide a low pass filter with a crystal filter, in front of the image pickup element. The low pass filter may however decline the resolution.

As compared with simple interpolation with the chrominance signal, methods of correcting the chrominance signal with components of the luminance signal are disclosed in U.S. Pat. No. 5,032,910 and Jpn. Pat. KOKAI Publication No. 5-056446.

In U.S. Pat. No. 5,032,910, while the luminance signal Y is generated by the linear interpolation, the chrominance signal C is treated differently according to the variation of the signal Y. In the region where the luminance signal Y is less varied, the chrominance signal C is compensated by the linear interpolation, while in the region where the luminance signals is largely varied, the chrominance signal C' is restored by modifying the signal Y of that region in the following way:

$$C'=aY+b \quad (7)$$

where a and b are constants.

In No. 5-056446, while the luminance signal Y is generated by interpolation, the dropouts of chrominance signal C' are restored by subjecting both the luminance signal Y and the chrominance signal C to electrical lowpass filtering to have their low frequency components $Y_{low}$ and $C_{low}$ which are then used in Equation (8).

$$C' = Y\frac{C_{low}}{Y_{low}} \quad (8)$$

The chrominance C' is equivalent to a modified luminance signal Y using the low frequency components $Y_{low}$ and $C_{low}$.

However, firstly, the conventional method using the single CCD chip includes linear interpolation for the luminance signal and a combination of linear interpolation and luminance signal modification for the chrominance signal, thus causing the luminance signal to carry substantially ½ of information as compared with using a three CCD imaging system. Accordingly, dropouts from the chrominance signal will hardly be restored at high definition and speed.

Secondly, the conventional method restores the chrominance signal based on the luminance signal, hence requiring a more number of luminance filters than that of chrominance filters and failing to work with an arrangement of the filters at an equal ratio.

Thirdly, the conventional method includes linear interpolation for the luminance signal and a combination of interpolation and luminance signal modification for the chrominance signal. When a certain inexpensive type of optical lens system which may produce chromatic aberration and deteriorate a particular signal component is used, the method will hardly restore dropouts of the chrominance signal at high definition.

BRIEF SUMMARY OF THE INVENTION

It is thus a first object of the present invention to provide an image signal processor capable of restoring dropouts of the color signal at high fidelity according to a structural model of image.

It is a second object of the present invention to provide an image signal processor capable of restoring dropouts of the color signal with high fidelity and high speed according to a structural model of image.

It is a third object of the present invention to provide an image signal processor capable of restoring dropouts of the color signal with high fidelity when the rate of the dropout of the color signal is same among different colors.

It is a fourth object of the present invention to provide an image signal processor capable of restoring dropouts of the color signal with high fidelity by repeatedly using a structural model of image.

It is a fifth object of the present invention to provide an image signal processor capable of restoring dropouts of the color signal which is generated by employing a certain inexpensive optical lens system with high fidelity by smoothing a structural model of image in accordance with the chromatic aberration.

According to a first feature for achievement of the first object of the present invention, an image signal processor for processing an image signal where each pixel is composed of more than one color signals and at least one of the color signals are dropped out according to the location of the pixel, comprises: an extracting unit for extracting from the image signal the color signals of a local area of a predetermined size which includes a desired pixel; a reference image generating unit for modifying and combining the color signals of the local area extracted by the extracting unit on the basis of a structure model and an evaluation function to generate a reference image; and a restoring unit for restoring the dropout color signal in accordance with the reference image generated by the reference image generating unit.

As a second feature for achievement of the second object of the present invention, an image signal processor for processing an image signal where each pixel is composed of more than one color signals and at least one of the color signals are dropped out according to the location of the pixel, comprises: an extracting unit for extracting from the image signal the color signals of a local area of a predetermined size which includes a desired pixel; a color signal selecting unit for calculating parameters from each of the color signals of the local area extracted by the extracting unit and selecting one of the color signals according to the parameters; a modifying unit for modifying the shape of the other color signals than the selected color signal so that their parameters are equal to the parameters of the selected color signal; a candidate image generating unit for combining the modified color signals modified by the modifying unit and the selected color signal selected by the color signal selecting unit to generate reference image candidates; a reference image selecting unit for selecting as a reference image one of the reference image candidates generated by the candidate image generating unit in accordance with a given evaluation function; and a restoring unit for restoring the dropout color signal with the use of the reference image determined by the reference image selecting unit.

As a third feature for achievement of the third object of the present invention, the image signal processor according to the first feature of the present invention further comprises an input unit having an imaging element for taking an image of an object to produce the color signals, the imaging element including an array of color filters, each color filter allocated to each pixel for the color signal, which is spatially arranged by repeatedly aligning square areas of an m×n pixel size where m and n are integers of three or higher, the square area designed so that the rate of appearance is uniform between the different color signals.

As a fourth feature for achievement of the fourth object of the present invention, the image signal processor according to the first feature of the present invention is characterized in that the restoring unit includes a luminance signal generating unit for generating a luminance signal from each of the color signal restored corresponding to the reference image, and a convergence determining unit for repeating a restoring process with the luminance signals through reviewing a profile of the luminance signals.

According to a fifth feature for achievement of the fifth object of the present invention, an image signal processor for processing an image signal where each pixel is composed of more than one color signals and at least one of the color signals are dropped out according to the location of the pixel, comprises: an input unit including an optical lens system where chromatic aberration occurs and an imaging element where the rate of appearance of the color signals is adjusted based on the amount of their chromatic aberration; an extracting unit for extracting from the image signal produced by the input unit color signals of a local area of a predetermined size including a desired pixel; an approximate reference image generating unit for modifying and combining color signals which have a low degree of the chromatic aberration in accordance with a structure model and an evaluation function to generate an approximate reference image; a smoothing unit for smoothing the approximate reference image generated by the approximate reference image generating unit in accordance with a degree of the chromatic aberration of a high aberration color signal; and a restoring unit for generating a reference image from the approximate reference image generated by the approximate reference image generating unit and the smoothed approximate reference image generated by the smoothing unit and using them to restore the dropout color signal.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 4A and 4B are diagrams showing explicitly an array of filters in a CCD illustrated in FIG. 3;

FIG. 15 is a diagram showing explicitly a signal modifying section illustrated in FIG. 14;

FIGS. 16A to 16D are diagrams showing an array of filters in a single CCD according to the fourth embodiment of the present invention;

DETAILED DESCRIPTION OF THE INVENTION

Figure 1:
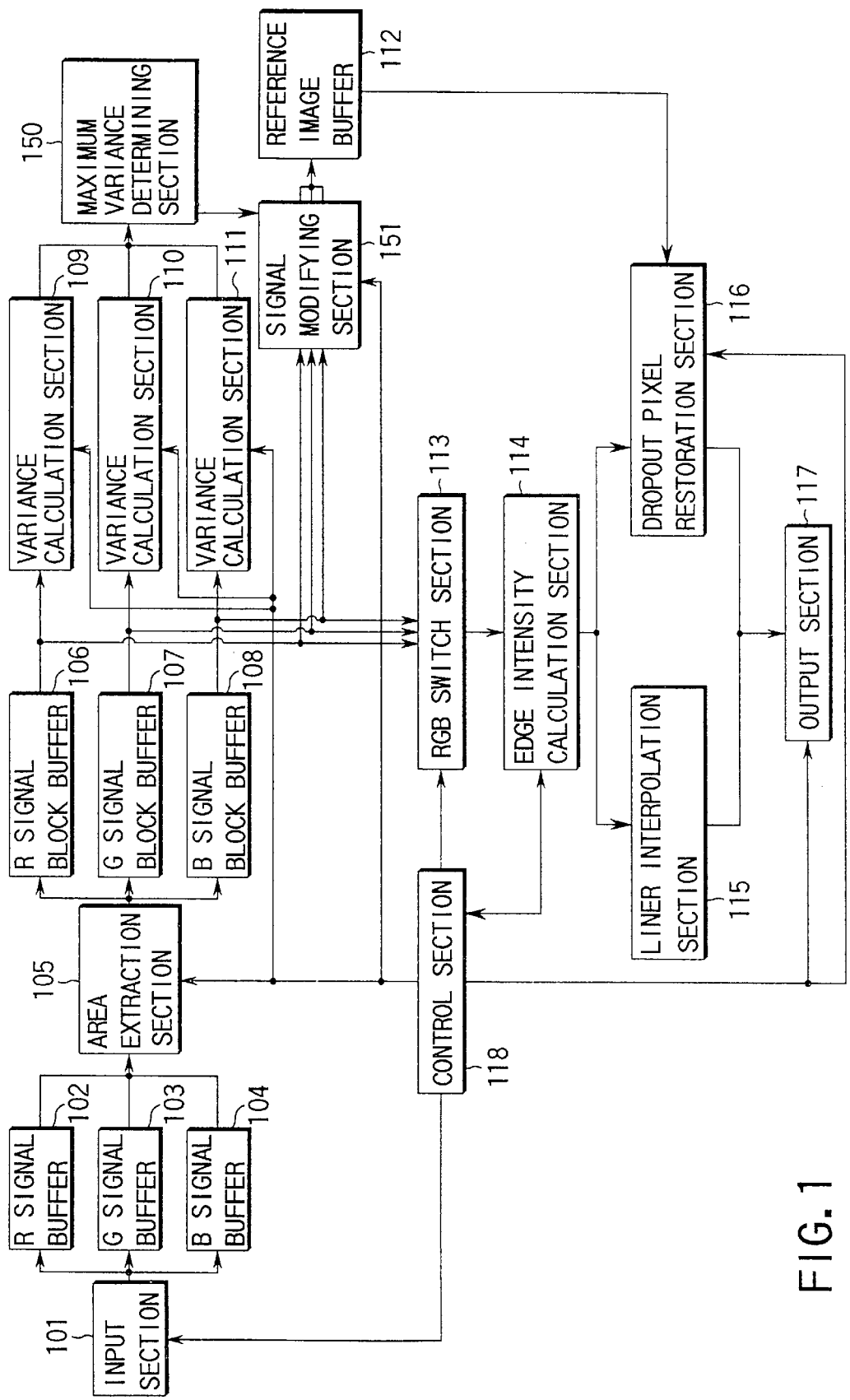
FIG. 1 is a functional block diagram of an image signal processor showing a first embodiment of the present invention.

Embodiment of the present invention will be described in more detail referring the accompanying drawings. The description starts with the first embodiment. FIG. 1 is a functional block diagram showing an image signal processor of the first embodiment and its functions are explained below in succession.

As shown in FIG. 1, an input section 101 is connected to a group of an R signal buffer 102, a G signal buffer 103, and a B signal buffer 104 and via an area extraction section 105 to another group of an R signal block buffer 106, a G signal block buffer 107, and a B signal block buffer 108. The R signal block buffer 106 is connected to a variance calculation section 109, an RGB switch section 113, and a signal modifying section 151, the G signal block buffer 107 to a variance calculation section 110, the RGB switch section 113, and the signal modifying section 151, and the B signal block buffer 108 to a variance calculation section 111, the RGB switch section 113, and the signal modifying section 151. The three variance calculation sections 109, 110, and 111 are connected via a maximum variance determining section 150 to the signal modifying section 151.

The signal modifying section 151 is further connected via a reference image buffer 112 to a dropout pixel restoration section 116. The RGB switch section 113 is connected via an edge intensity calculation section 114 and either a linear interpolation section 115 or the dropout pixel restoration section 116 to an output section 117. A control section 118 is provided for connection between the input section 101, the area extraction section 105, the variance calculation section 109, 110, and 111, the signal modifying section 151, the RGB switch section 113, the edge intensity calculation section 114, the dropout pixel restoration section 116, and the output section 117.

Figure 2:
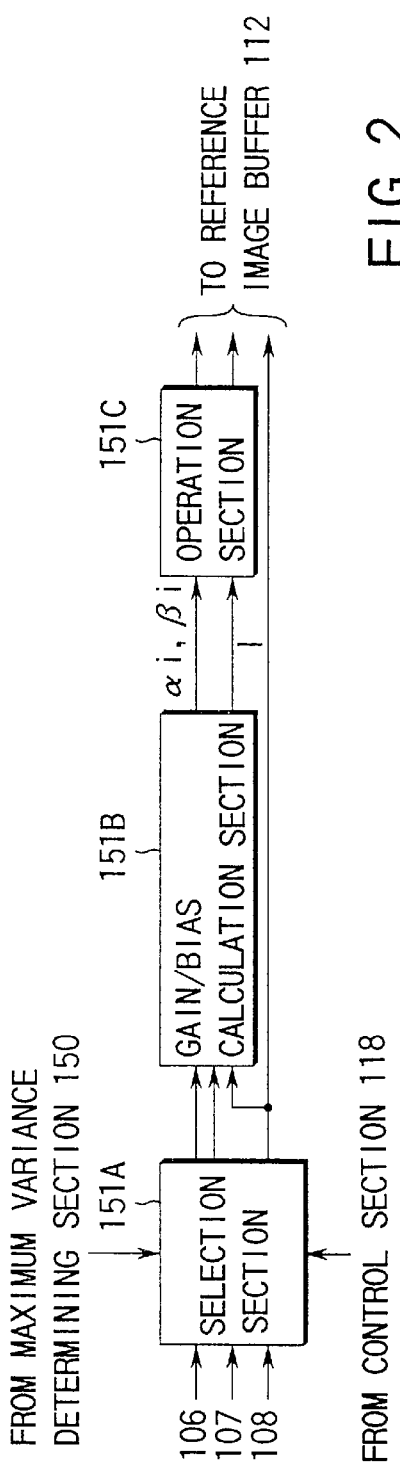
FIG. 2 is a diagram showing explicitly a signal modifying section illustrated in FIG. 1.

FIG. 2 is a diagram showing explicitly an arrangement of the signal modifying section 151, wherein the selection section 151A receives signals from the R signal block buffer 106, the G signal block buffer 107, the B signal block buffer 108, the maximum variance determining section 150, and the control section 118, further, the selection section 151A, a gain/bias calculation section 151B, and an operation section 151C are connected in this order.

In this embodiment, some of the prescribed functions are implemented with known hardware; the input section 101 comprises a single chip CCD, the output section 117 a magnetic disk unit, and the control section 118 a microcomputer.

Figure 3:
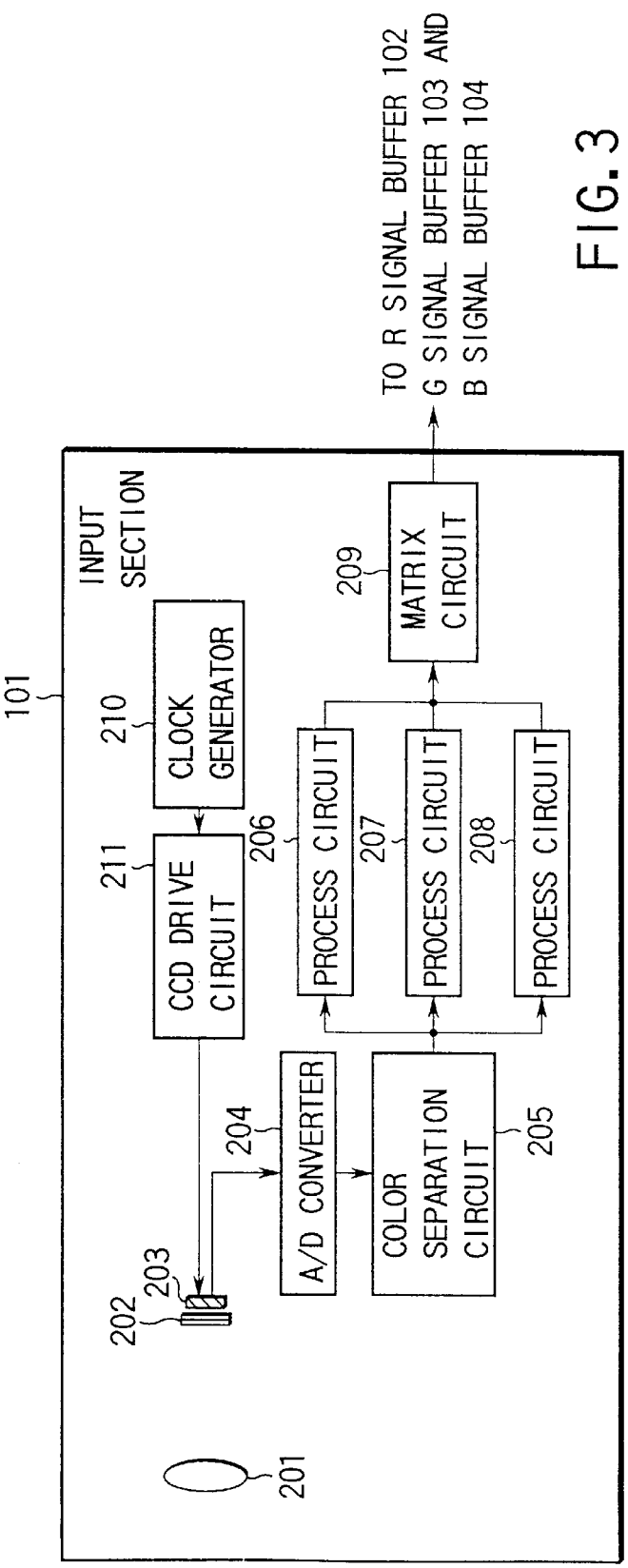
FIG. 3 is a diagram showing explicitly a signal input section illustrated in FIG. 1.

FIG. 3 is a diagram showing explicitly an arrangement of the input section 101, in which a lens system 201, a lowpass filter 202, and a single chip CCD 203 are arranged in a combination for picking up an image of an object of interest. The CCD 203 includes, for example, an array of primary color filters such as explained below and is connected to a matrix circuit 209 via an A/D converter 204, a color separation circuit 205, and three processing circuit 206, 207, and 208. The matrix circuit 209 is further connected at its output to the RGB signal buffers 102, 103, and 104. Also, the CCD 203 is coupled to a CCD drive circuit 211 responsive to a clock signal from a clock generator 210 for driving the CCD 203.

Figures 4A, 4B:
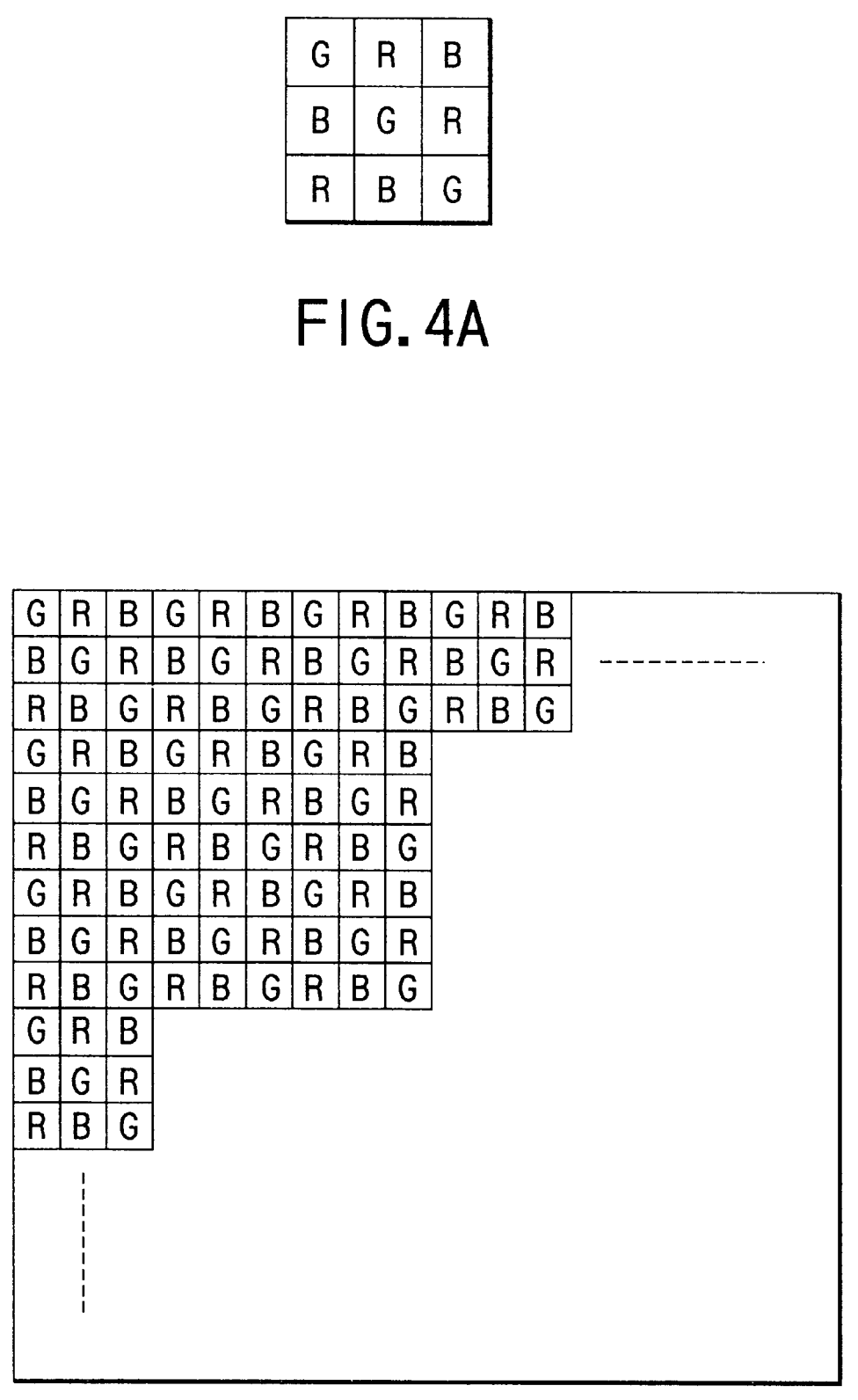

FIGS. 4A and 4B are diagrams showing explicitly the array of filters in the CCD 203 illustrated in FIG. 3. The entire CCD panel of pixels shown in FIG. 4B comprises a specific number of repeatedly aligned basic 3×3 pixel clusters shown in FIG. 4A. It is assumed in this embodiment that the three, R, G, and B, signals appear exactly in the equal rate.

Figure 5:
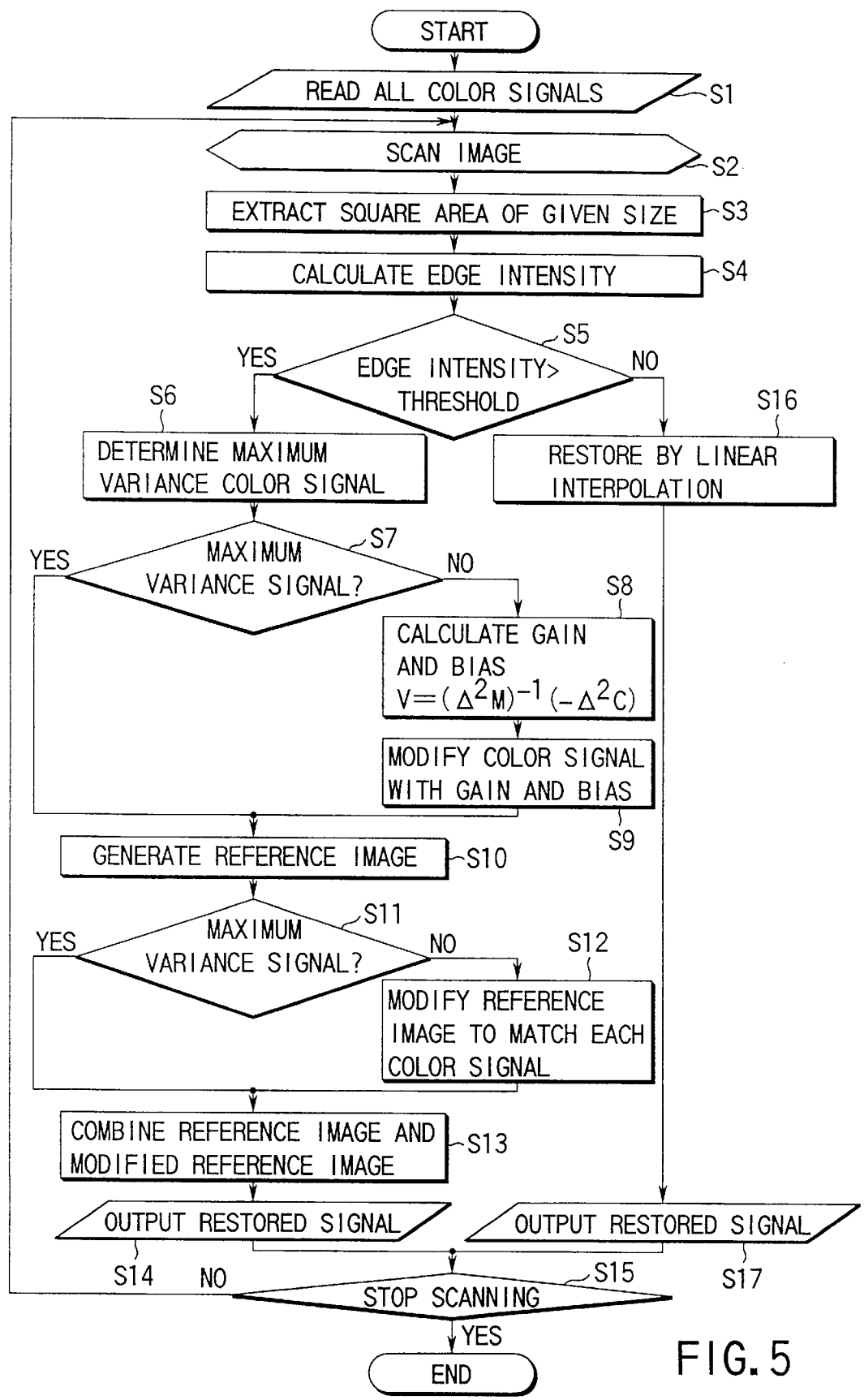
FIG. 5 is a flowchart explaining an operation of the arrangement illustrated in FIG. 1.

The operation of the arrangement shown in FIG. 1 is now explained referring to a flowchart of FIG. 5.

In response to a control signal of the control section 118 shown in FIG. 1, three, R, G, and B, signals of an image are read through the input section 101 and transferred to the R signal buffer 102, the G signal buffer 103, and the B signal buffer 104 respectively (Step S1). The area extraction section 105 then scans the image according to a control signal from the control section 118 (Step S2), extracts from the three color signals saved in the RGB signal buffers 102, 103, and 104 three color components of a square area of pixels which is centered at the specified pixel and has a particular size, for example, 5×5 pixels (Step S3), and delivers the three color signals to the R signal block buffer 106, the G signal block buffer 107, and the B signal block buffer 108 respectively. In response to a control signal from the control section 118, the RGB switch section 113 then retrieves the three color signals of the square area from the corresponding block buffers 106, 107, and 108 and transmits them to the edge intensity calculation section 114. The edge intensity calculation section 114 according to a control signal of the control section 118 calculates an edge intensity from each of the color signals with Laplacian operator (Step S4) and examines whether or not the edge intensity is greater than a predetermined threshold (for example, 8 if the signal varies from 0 to 255 levels which corresponds to eight bits) (Step S5). If the answer is yes, the dropout pixel restoration section 116 is selected and the color signals are transmitted for the proceeding step and if not, the linear interpolation section 115 is selected and the color signals are transmitted.

In case that the linear interpolation section 115 has been selected, dropout pixels are restored by a known linear interpolation method and their relevant output is delivered from the output section 117 (Steps S16 and S17). When the dropout pixel restoration section 116 has been selected, the action of the variance calculation sections 109, 110, and 111 are triggered by the control section 118. More specifically, in response to a control signal from the control section 118, each of the variance calculation sections 109, 110, and 111 reads out its corresponding color signal of the square area from the block buffer 106, 107, or 108 to calculate a degree of variance. Then, the maximum variance determining section 150 compares three variance results to determine the color signal of which variance is largest (Step S6).

In response to a control signal from the control section 118, the selection section 151A of the signal modifying section 151 (FIG. 2) selects one of the three signals of the square area saved in the block buffers 106, 107, and 108 (Step S7), according to the result of the maximum variance determining section 150. One of the three color signals of the square area in the block buffers 106, 107, and 108 which is largest in the variance is directly transferred to the reference image buffer 112 without being modified. The other color signals are given to the gain/bias calculation section 151B. The gain/bias calculation section 151B calculates from each the color signal a gain $\alpha_i$ and a bias $\beta_i$ (Step S8) which are then supplied together with the color signal I to the operation section 151C. The operation section 151C modifies the color signal I using the gain $\alpha_i$ and the bias $\beta_i$ and delivers the modified signal to the reference image buffer 112 (Step S9). The original color signal with the largest variance and the modified color signals are integrated in the reference image buffer 112 so that no portion of the image has no signal value, thus generating a reference image (Step S10).

It is then examined in the dropout pixel restoration section 116 for each of the color signals transmitted whether or not its variance is largest (Step S11). When it is judged yes, the reference image is transferred to the output section 117 for that color signal. If not, the reference image from the reference image buffer 112 is compared with the color signal on the portion where the color signals are obtained and modified so as to match the color signal (Step S12). Accordingly, both the unmodified and the modified reference image are integrated in the output section 117 (Step S13). Finally, the integrated reference images are outwardly released from the output section 117 as a chrominance signal where dropouts are restored (Step S14).

As every square area of the image in each of the RGB signal buffers 102, 103, and 104 has been scanned and processed with out overlap, all the dropouts in the image are restored (Step S15).

The production of the reference image is explained in more detail referring to FIGS. 6(a) to 6(j). In this embodiment, the reference image is produced using a so-called color edge model. In the color edge model, the three color signals are assumed to share the underlying edge structure in a small portion of an image. It is widely known that such a model is commonly established for most of applicable images in nature. Therefore, with the use of such a color edge model, the color signal of different colors can be modified to match each other through adjusting the two shape parameters which are called the gain ($\alpha$) and the bias ($\beta$), in the following way.

FIGS. 6(a), 6(b), and 6(c) illustrate the original profile of the R, G and B signals around an edge in an image together with their gain $\alpha_i$=maximum value-minimum value and the bias $\beta_i$=minimum value (i=r, g and b). When the image is scanned by a CCD having an array of filters shown in FIG. 6(d), its RGB color signals are as shown in FIGS. 6(e), 6(f), and 6(g). The three signals shown in FIGS. 6(e), 6(f), and 6(g) are then combined with their gain $\alpha_i$ and bias $\beta_i$ adjusted, hence producing the estimates of the profile of the underlying edge structure. Several candidates are shown in FIGS. 6(h), 6(i), and 6(j). In this step, the parameters of the color signal which is largest in the parameters of the variance is not adjusted but the other two signals are adjusted, as described previously.

This is followed by selecting one of the edge structure profile estimates which is highest in localization as the reference image. For examining the localization, a known method such as a Laplacian operator may be used in which the edge intensity is calculated and checked to select its smallest value. The edge structure of the reference image defined by combining the three color signals seamlessly possibly represents the underlying one of the original image. Hence, when the gain and bias in the reference image have been modified so that the correspond to $\alpha_i$ and $\beta_i$ of each color signal in respect of minimum square error, dropouts in the color signal are restored.

In this embodiment, the procedure is not selecting the reference image by generating various edge structure profiles but determining function such as a Laplacian, which can be solved explicitly and efficiently the gain $\alpha_i$ and the bias $\beta_i$ which exhibit the smallest edge intensity under an evaluation. Also, the calculation of the gain $\alpha_i$ and the bias $\beta_i$ on all the three color signals is not necessary but may be simplified by adjusting two of them to match the profile of one particular color signal. For example, while the color signal which is largest in the variance remains intact, other color signals are modified so that the combined edge structure profile exhibits the highest localization, as will be explained below in more detail.

The use of a Laplacian as an evaluation function for matching, for example, the R and B color signals to the G color signal is now explained.

It is assumed that the gains of the R and B signals are $\alpha_r$ and $\alpha_b$, and the biases $\beta_r$ and $\beta_b$, respectively. Also, the pixels values of the R, G, and B signals are expressed in one-dimensional vector by $f_r$, $f_g$, and $f_b$ respectively and the mask values indicative of pixel dropouts by $m_r$, $m_g$, and $m_b$ respectively. The mask value is 1 when the color signal exists but 0 when not. Then, the reference image $\phi$ is expressed by:

$$\phi = (\alpha_r f_r + \beta_r) m_r + f_g m_g + (\alpha_b f_b + \beta_b) m_b \qquad (9)$$

$$= [f_r, m_r, f_b, m_b] \begin{bmatrix} \alpha_r \\ \beta_r \\ \alpha_b \\ \beta_b \end{bmatrix} + f_g m_g = Mv + C$$

It is now assumed that Equation (10) for the reference image $\phi$ with a Laplacian $\Delta^2$ is minimized.

$$\Delta^2\phi = |\Delta^2(Mv+C)| \qquad (10)$$

Then, $v = [\alpha_r, \beta_r, \alpha_b, \beta_b]^T$ is turned to:

$$v = (\Delta^2 M)^{-1}(-\Delta^2 C) \qquad (11)$$

as defined uniquely. In this case, the gains $\alpha_r$ and $\alpha_b$ and the biases $\beta_r$ and $\beta_b$ of the R and B signals are determined to match the G signal.

M is not a square matrix and a pseudo inverse matrix has to be calculated. Also, while Equation (11) resides in matching the R and B signals to the G signal, another combination for the color signals may be used in the same way.

Figure 7:
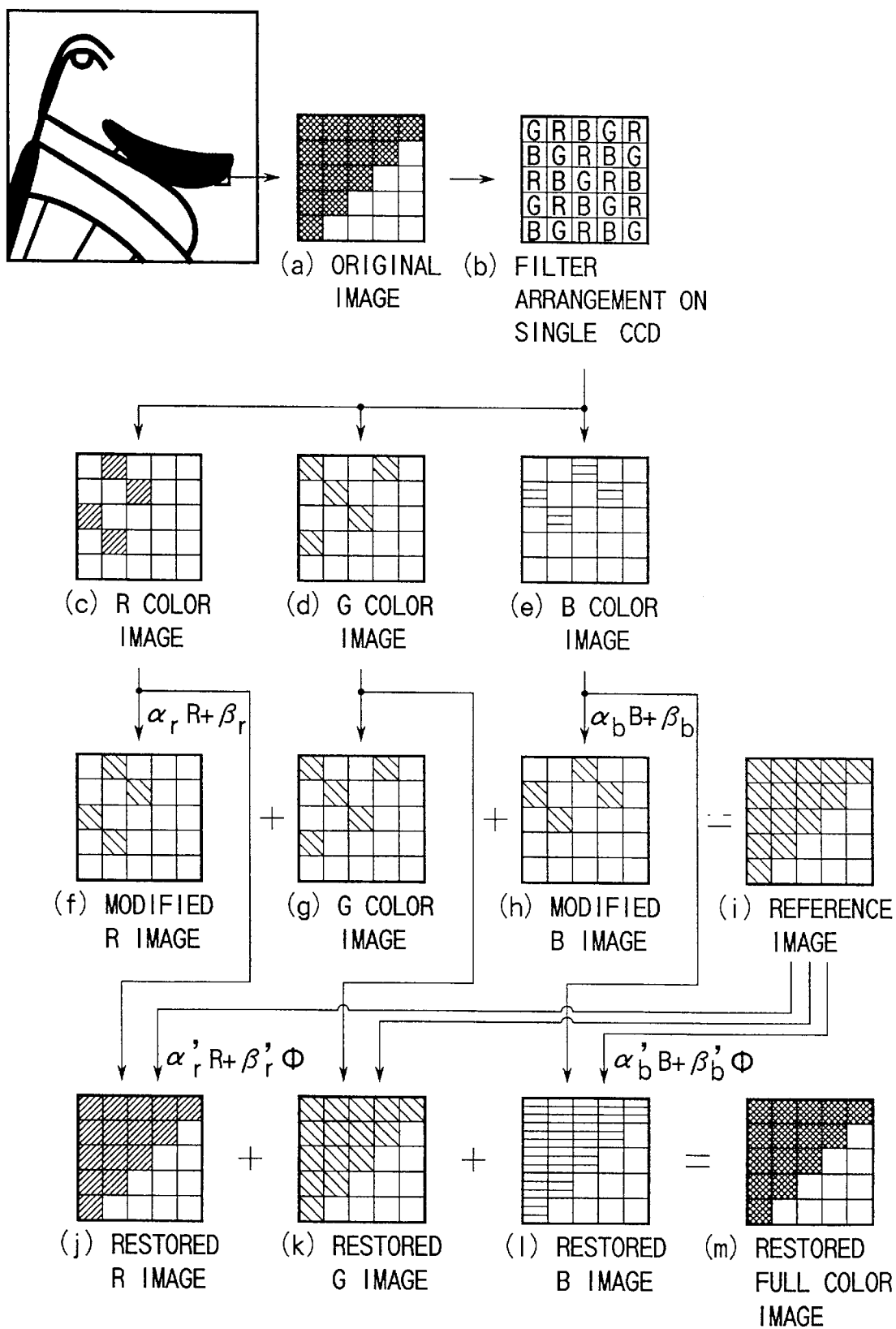
FIG. 7 is a view showing steps of restoring dropout pixels in reference to a color edge model.

FIG. 7 is a view showing the procedure of restoring dropout pixels according to the color edge model. It is noted that the following description uses the square area of 5×5 pixels. FIG. 7(a) illustrates a section of the original image of a saddle of a bicycle. Three color signals produced from the image by a CCD 203 having a filter arrangement shown in FIG. 7(b) are read (via the input section 101) to the R signal buffer 102, the G signal buffer 103, and the B signal buffer 104 and then transferred via the area extraction section 105 to the R signal block buffer 106, the G signal block buffer 107, and the B signal block buffer 108 respectively.

As described previously, the color signals including dropouts are transmitted and their variances are calculated in the variance calculation sections 109, 110, and 111 to determine degrees of variation. Then, the R, G, and B signals are modified through matching the other two signals to one particular signal which is largest in the variance (in the maximum variance determining section 150 and the signal modifying section 151). Herein, it is assumed that the gain and biases of the R and B signals are calculated from the G signal which has the largest variance. FIGS. 7(f) and 7(h) illustrate modified images of the R and B signals using the gains $\alpha_r$ and $\alpha_b$ and the biases $\beta_r$ and $\beta_b$ calculated from Equation (11) while FIG. 7(g) shows the G signal remaining intact.

The three images shown in FIGS. 7(f), 7(g), and 7(h) are integrated to have a reference image φ (in the reference image buffer 112) shown in FIG. 7(i). The reference image φ is highest in the localization of edge intensity based on the Laplacian. The RGB switch section 113 reads the color signals (FIGS. 7(c), 7(d), and 7(e)) having dropouts from their respective block buffers 106, 107, and 108 and the edge intensity calculation section 114 calculates the edge intensity. When the edge intensity is greater than the threshold, the color signals are transferred to the dropout pixel restoration section 116. If smaller, the signal is sent to the linear interpolation section 115 where dropouts are restored by linear interpolation. The dropout pixel restoration section 116 calculates the gain and bias of the reference image φ from the reference image buffer 112 and adjusts them to the gain and bias of the color signal having dropouts. In this embodiment, the reference image φ is generated from the G color signal and the gain and bias in the G signal are identical to those of the reference image φ. Hence, the adjustment of the gain and bias should be carried out for the R and B color signals. As the result, the three color signals are restored as shown in FIGS. 7(j), 7(k), and 7(l) respectively. Those signals are then integrated in the output section 117 to have a composite restored full-color image shown in FIG. 7(m).

As described, the first embodiment incorporates evaluating all the three color signals, which have derived from a local area judged as an edge area, over the edge localization on the basis of color edge models and Laplacian operator to generate a reference image and utilizing the reference image to restore each of the color signal which has dropouts. Accordingly, high frequency components of the color signal which are hardly handled by conventional linear interpolation can successfully be restored hence allowing a higher fidelity image to be restored. When the color signal is judged that it contains no edge, it will be processed at a higher speed by the conventional linear interpolation. The array of filters for the three, R, B, and G, color signals are to have the equal rate of appearance, thus preventing generation of any unbalanced effect e.g. where the chrominance signal is declined more than the luminance signal, contributing to the restoration of a higher fidelity image.

Although the local area of interest is defined by a 5×5 pixel size in the above embodiment, it is of no limitation and may be constructed in any other size. The embodiment permits rows of the local areas to be not overlapped each other. If the consumption of time is not concerned, the areas may be processed with overlap by one pixel to compute an average. In this case, the restoration error introduced in the color edge model by the noises can be minimized. Also, the evaluation on the localization is not limited to Laplacian operation and may be performed by utilizing energy or entropy from density co-occurrence matrix or correlation or local uniformity. The array of filters is not limited to the design shown in FIG. 4 and may be configured to any desired plan. With a conventional array of filters where the rate of the appearance of the luminance signal is increased, the improvement according to the present invention will be ensured with slightly low performance.

Figure 8:
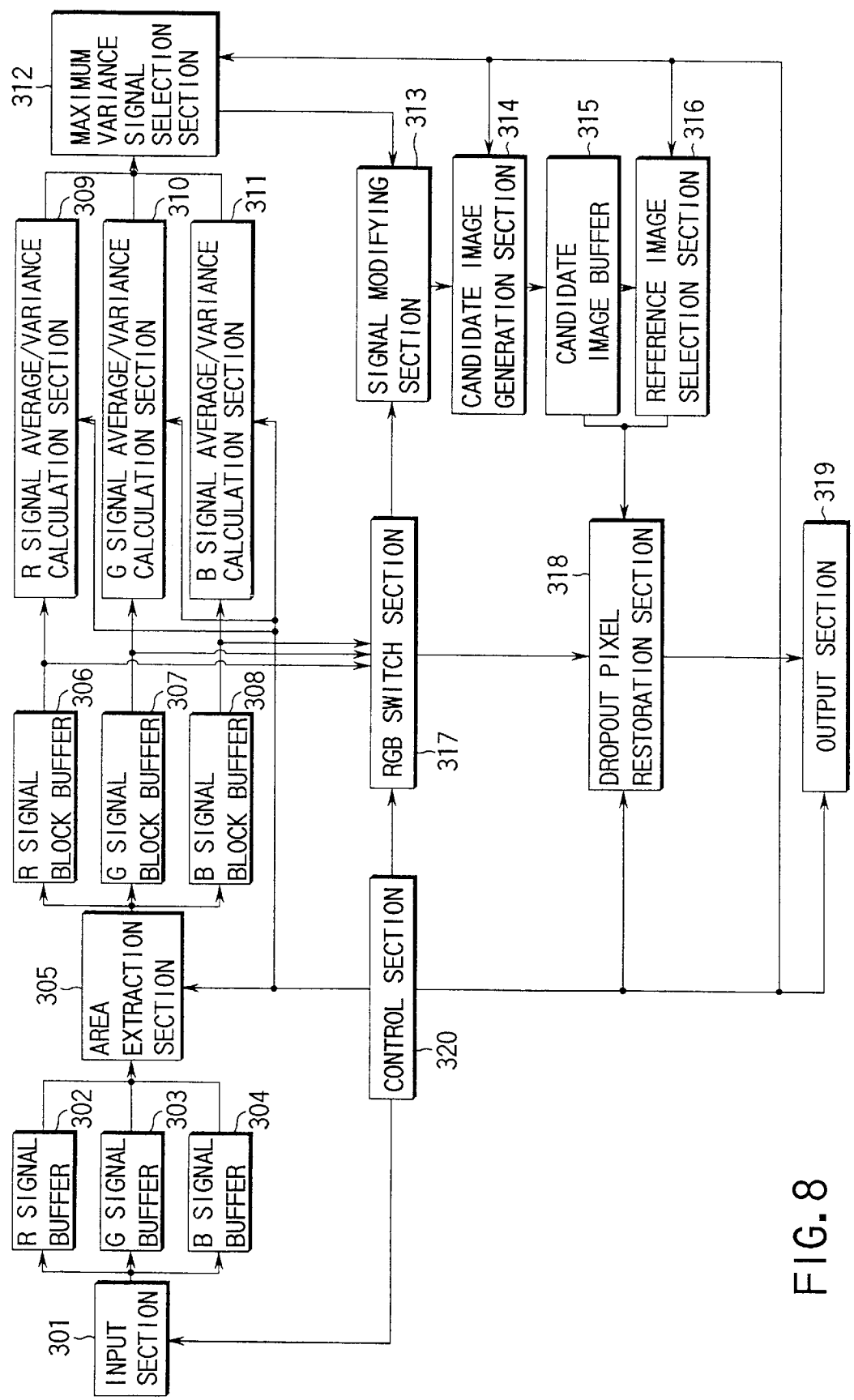
FIG. 8 is a functional block diagram of an image signal processor showing a second embodiment of the present invention.

FIG. 8 is a functional block diagram of an image signal processor according to a second embodiment of the present invention.

As shown in FIG. 8, an input section 301 is connected to a group of an R signal buffer 302, a G signal buffer 303, and a B signal buffer 304 which in turn are connected via an area extraction section 305 to another group of an R signal block buffer 306, a G signal block buffer 307, and a B signal block buffer 308 respectively. The R signal block buffer 306 is connected to an R signal average/variance calculation section 309 and an RGB switch section 317, the G signal block buffer 307 to a G signal average/variance calculation section 310 and the RGB switch section 317, and the B signal block buffer 308 to a B signal average/variance calculation section 311 and the RGB switch section 317.

The R signal average/variance calculation section 309, the G signal average/variance calculation section 310, and the B signal average/variance calculation section 311 are further connected to a maximum variance signal selection section 312. The maximum variance signal selection section 312 and the RGB switch section 317 are connected via a signal modifying section 313 and a candidate image generation section 314 to a candidate image buffer 315. A dropout pixel restoration section 318 is also connected to the RGB switch section 317. The candidate image buffer 315 is connected to a reference image selection section 316 as well as the dropout pixel restoration section 318. The reference image selection section 316 is coupled to the dropout pixel restoration section 318 which in turn is connected to an output section 319.

A control section 320 is provided for connection to the input section 301, the area extraction section 305, the R signal average/variance calculation section 309, the G signal average/variance calculation section 310, the B signal average/variance calculation section 311, the maximum variance selection section 312, the candidate image generation section 314, the reference image selection section 316, the RGB switch section 317, the dropout pixel restoration section 318, and the output section 319.

In this embodiment, some of the prescribed functions are implemented with known hardware; the input section 301 comprises a double chip CCD, the output section 319 a magnetic disk unit, and the control section 320 a microcomputer.

Figure 9:
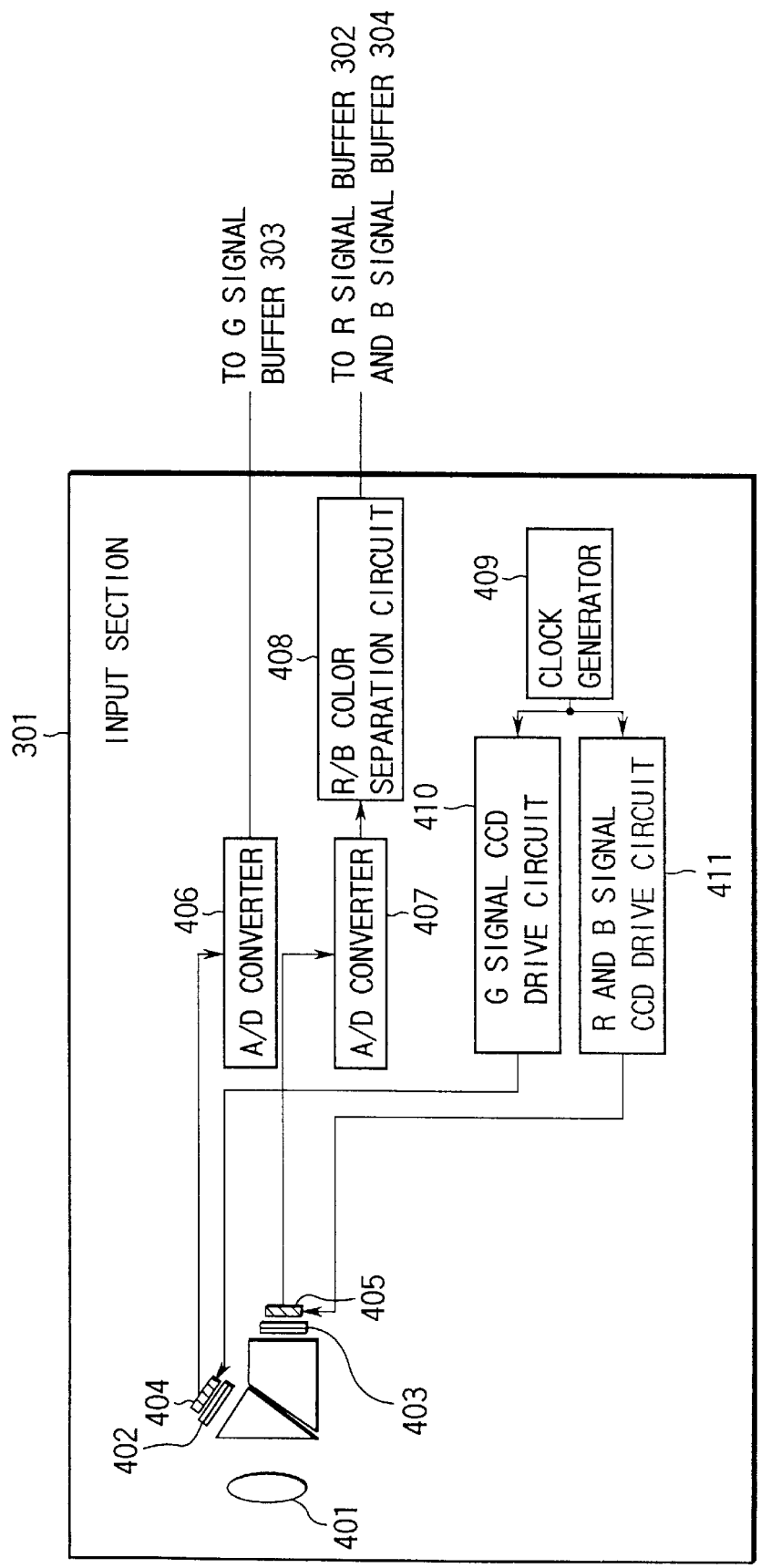
FIG. 9 is a schematic view showing explicitly an input section illustrated in FIG. 8.

FIG. 9 is a diagram showing explicitly an arrangement of the input section 301 in FIG. 8, in which a lens system 401, a G signal lowpass filter 402, a G signal CCD 404, an R and B signal lowpass filter 403, and an R and B signal CCD 405 are arranged in a combination for picking up an image of an object of interest. The G signal CCD 404 is connected to an A/D converter 406 to the G signal buffer 303. Also, the R and B signal CCD 405 is connected to an A/D converter 407 and an R/B separation circuit 408 to the R signal buffer 302 and the B signal buffer 304. The G signal CCD 404 and the R and B signal CCD 405 are also connected to a G signal CCD drive circuit 410 and an R and B signal CCD drive circuit 411 respectively which are responsive to clock signals from a clock generator 409 for driving their respective G signal 404 and R and B signal CCD 405.

Figure 10:
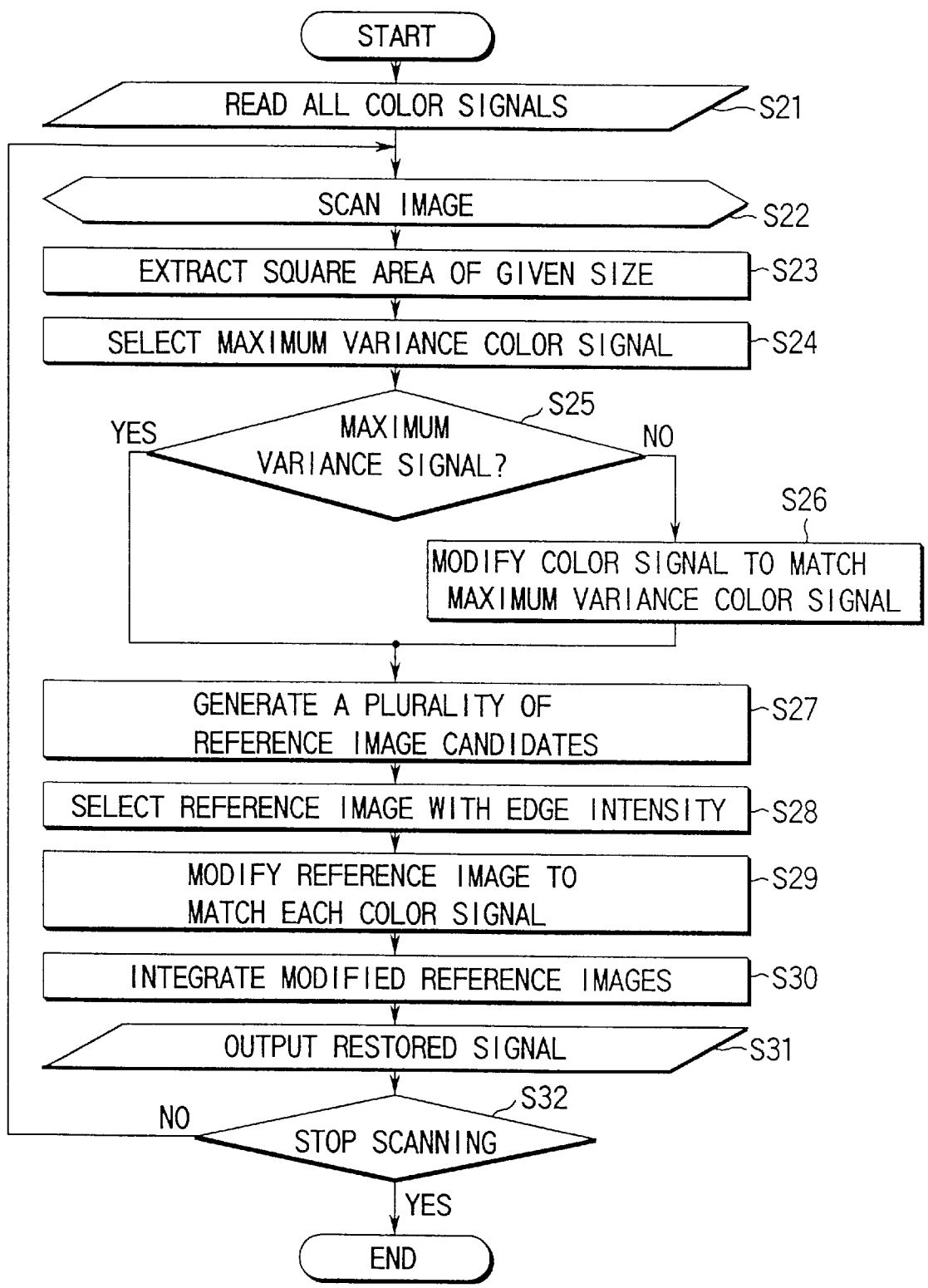
FIG. 10 is a flowchart explaining an operation of the arrangement illustrated in FIG. 8.

The operation of the arrangement shown in FIG. 8 will now be described referring to a flowchart of FIG. 10.

In response to a control signal of the control section 320, three, R, G, and B, signals of an image are read through the input section 301 and transferred to the R signal buffer 302, the G signal buffer 303, and the B signal buffer 304 respectively (Step S21). This is followed by the area extraction section 305 scanning an image in response to a control signal from the control unit 320 (Step S22), extracting in the form of data signals a particular square area of a given size centered at a target pixel and including, for example, 15×15 pixels (Step S23), and delivering the signals to the R signal block buffer 306, the G signal block buffer 307, and the B signal block buffer 308. In response to control signals from the control unit 320, the R signal average/variance calculation section 309, the G signal average/variance calculation section 310, and in response to a control signal from control unit 320, the B signal average/variance calculation section 311 retrieve the three color signals of the square area from their respective block buffers 306, 307, and 308 to calculate an average and a variance of each color signal.

The maximum variance signal selection section 312 upon receiving a control signal from the control unit 320 selects one of the three color signals 309, 310, 311 which is the largest in the variance and transmits it to the signal modifying section 313 (Step S24). Also, in response to a control signal from the control unit 320, the RGB switch section 317 reads the three color signals of the square area from their respective block buffers 306, 307, and 308 and sends them to the signal modifying section 313. Then, the signal modifying section 313 examines whether or not each the color signal received from the RGB switch section 317 is an input with the maximum variance (Step S25), performs a modifying action so that the two other color signals are equal to the maximum variance color signal in both the average and variance (Step S26), and releases modified signals to candidate image generation section 314. Meanwhile, the maximum variance color signal is directly supplied to the candidate image generation section 314 without any modifying action.

The modified color signals from the signal modifying section 313 are combined in different combinations in the candidate image generation section 314 to generate reference signal candidates (Step S27) which are then transferred to the candidate image buffer 315. After completion of transfer of all the candidates, the reference image selection section 316 upon receiving a control signal from the control section 320 selects one of the reference image candidates which is lowest in the edge intensity or highest in the edge localization (Step S28) as the reference signal selection output which is then sent to the dropout pixel restoration section 318. The dropout pixel restoration section 318 retrieves from the candidate image buffer 315 the reference image corresponding to the reference signal selection output of the reference image selection section 316. After completion of the retrieval and in response to a control signal from the control section 320, the dropout pixel restoration section 318 subjects the reference image from the candidate image buffer 315 to such a modifying action that the reference signal matches its corresponding color signal supplied by the RGB switch section 317 from the R signal block buffer 306, the G signal block buffer 307, or the B signal block buffer 308, similar to the modifying action of the first embodiment (Step S29) before transferring to the output section 319. The resultant modified reference images are integrated in the output section 319 (Step S30) and delivered to the outside as a restored composite color signal where dropouts are restored (Step S31).

As set forth above, the images in the color signal buffers 302, 303, and 304 are scanned and compensated without overlapping the square areas (Step S32), while dropouts in the color image can be restored.

It is appreciated that the use of a double chip CCD according to this embodiment assigns the G color signal as no dropout signal. This allows a particular area where the G color signal is overwhelming to provide a reference image with no use of the color edge model. However, such areas as having higher chrominance levels of the R and B colors are low in the G color signal level and will thus be susceptible to noise. Accordingly, the restoration of the R and B color signals on the basis of the reference images of the G color signal is less dependable for restoration of a high fidelity image.

For compensation, the embodiment permits calculating the variance of the R, G, and B color signals in the R signal average/variance calculation section 309, the G signal average/variance calculation section 310, and the B signal average/variance calculation section 311 respectively, selecting in the maximum variance selection section 312 the color signal which is maximum in the variance, and determining the color edge model over the maximum variance color signal. It should be noted that while the description hereinafter assumes the R color signal as the maximum variance color signal, any color signal can be treated with equal success.

In the signal modifying section 313, the gains $\alpha_g$ and $\alpha_b$ and the biases $\beta_g$ and $\beta_b$ are calculated to match the variances $\sigma_g$ and $\sigma_g$ and the averages $AV_g$ and $AV_b$ of the G and B color signals with the variance $\sigma_r$ and $AV_r$ of the R color signal, using the following equations.

$$\alpha_g = \pm \sqrt{\frac{\sigma_g^2}{\sigma_r^2}}, \beta_g = AV_r - AVg\alpha g \tag{12}$$

$$\alpha_b = \pm \sqrt{\frac{\sigma_g^2}{\sigma_b^2}}, \beta_b = AV_r - AV_b\alpha_b \tag{13}$$

As apparent from Equations (12) and (13), two pairs of differently signed solutions of the gain and bias are established for each color signal and for the G and B signals, four pairs are given. In the candidate image generation section 314, four pairs of the reference image candidates are produced from different combinations of the G and B color signals modified with the gains $\alpha_g$ and $\alpha_b$ and the biases $\beta_g$ and $\beta_b$ before transferred to the candidate image buffer 315. In the reference image selection section 316, one of the reference image candidates which is lowest in the edge intensity or highest in the edge localization is selected as the reference image by the Laplacian operation. The selected image is then given to the dropout pixel restoration section 318 where dropouts are restored by the same manner as of the first embodiment.

As set forth above, the second embodiment provides adjusting, on the basis of a particular one of three color signals of interest which is maximum in the variance, the gains and biases of the two other color signals to generate a small number of reference image candidates, and selecting a reference image from the candidates through Laplacian evaluation over the edge localization for restoration of dropouts in the color signals. Accordingly, high frequency components which are hardly compensated by the conventional linear interpolation can be restored thus contributing to the restoration of a high fidelity image. Also, since the average and the variance are used in a combination, their arithmetic operation is less bulky and will be executed at a higher speed.

While the embodiment employs but is not limited to a double chip CCD, a single chip CCD may be provided with an input arrangement having e.g. Bayer filters. Also, the parameters of variance and average for the modifying are not of limitation and other parameters such as maximum and minimum values may be used with equal success.

Figure 11:
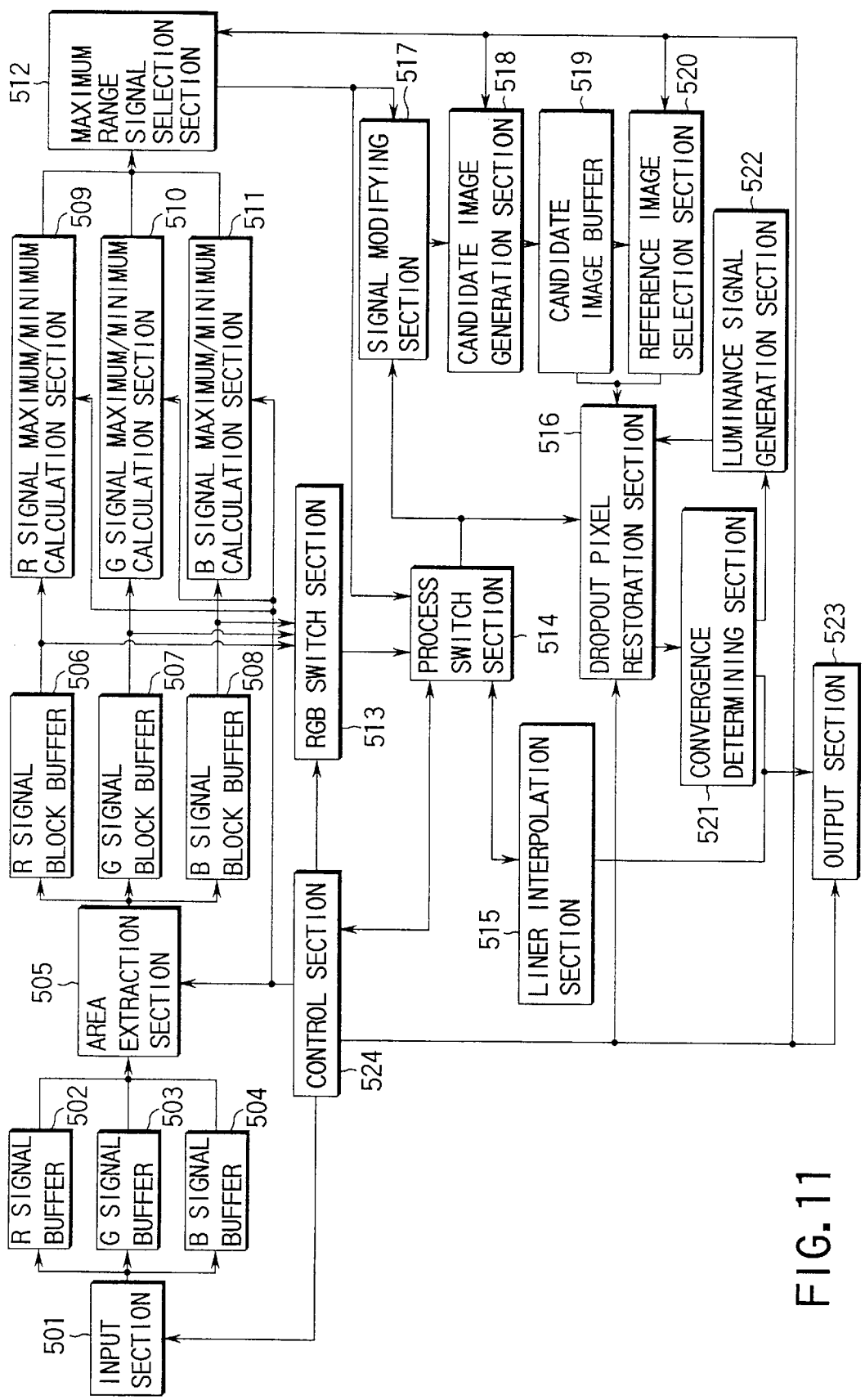
FIG. 11 is a functional block diagram of an image signal processor showing a third embodiment of the present invention.

FIG. 11 is a functional block diagram of an image signal processor showing a third embodiment of the present invention and its functions in connection are explained below.

As shown in FIG. 11, an input section 501 is connected to a group of an R signal buffer 502, a G signal buffer 503, and a B signal buffer 504 which in turn are connected via an area extraction section 505 to another group of an R signal block buffer 506, a G signal block buffer 507, and a B signal block buffer 508 respectively. The R signal block buffer 506 is connected to an R signal maximum/minimum calculation section 509 and an RGB switch section 513, the G signal block buffer 507 to a G signal maximum/minimum calculation section 510 and the RGB switch section 513, and the B signal block buffer 508 to a B signal maximum/minimum calculation section 511 and the RGB switch section 513.

The maximum/minimum calculation sections 509, 510, and 511 are further connected to a maximum range signal selection section 512. The maximum range signal selection section 512 are connected a process switch section 514 and a signal modifying section 517. The process switch section 514 is also coupled to the RGB switch section 513. The process switch section 514 is further connected to a linear interpolation section 515 and a dropout pixel restoration section 516 as well as the signal modifying section 517. The linear interpolation section 515 is connected to an output section 523. The signal modifying section 517 is connected via a candidate image generation section 518 to a candidate image buffer 519 which is in turn connected to a reference image selection section 520 and the dropout pixel restoration section 516. The reference image selection section 520 is hence connected to the dropout pixel restoration section 516. The dropout pixel restoration section 516 is further connected via a convergence determining section 521 to a luminance signal generation section 522 as well as the output section 523. The luminance signal generation section 522 is also connected to the dropout pixel restoration section 516.

A control section 524 is provided for connection to the input section 501, the area extraction section 505, the R signal maximum/minimum calculation section 509, the G signal maximum/minimum calculation section 510, the B signal maximum/minimum calculation section 511, the maximum range selection section 512, the RGB switch section 513, the process switch section 514, the dropout pixel restoration section 516, the candidate image selection section 518, the reference image selection section 520, and the output section 523.

In this embodiment, some of the prescribed functions are implemented with known hardware; the input section 501 comprises a single CCD (FIG. 3), the output section 523 a magnetic disk unit, and the control section 524 a microcomputer.

Figures 12A, 12B:
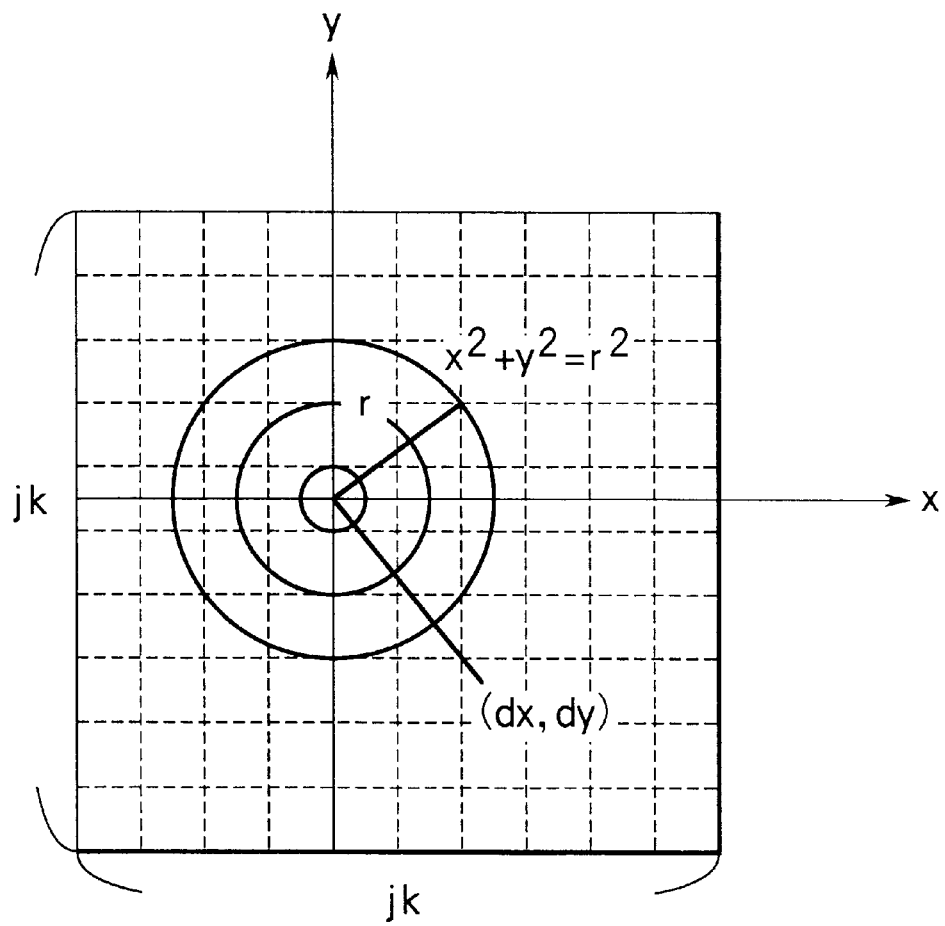
FIGS. 12A and 12B are explanatory views of an array of filters in the input section illustrated in FIG. 11.

FIGS. 12A and 12B illustrate an array of filters in the input section 501. It is desirable that the filter colors are arranged uniform in the rate of appearance and random in the location because all the input signals are used to generate a reference image for restoration over a color edge model. However, the random arrangement of pixels has to be recorded as location data and may be troublesome.

Alternatively, as explained in the first embodiment, the filter arrangement is made by repeatedly aligning square unit areas. The square area as a fundamental unit in the filter arrangement is defined by:

a jk by jk size where j is the number of color signals to be used and k is an integer of two or higher, a uniform frequency of appearance of the color signals in the square area, and greater than 2 and smaller than j of the appearance rate of each color signal in the horizontal and vertical directions.

FIG. 12A shows an example of the square area of the R, G, and B signals having a 6×6 pixel size. Also, the square area may incorporates a quasi-random arrangement having a concentric pattern, as shown in FIG. 12B. In the latter case, a circle having a radius r is given with its center designated to a particular point (dx, dy), $0 \leq dx \leq jk$ and $0 \leq dy \leq jk$, in the square area. The radius r is determined when the trace of the circle intersects an integer coordinate point. The radius r is then converted to an integer and the total number of the color signals is divided by j. With the use of the three, R, G, and B, color signals, the division by 3 is performed having a remainder 0, 1, or 2. The color signal is then assigned to the remainder. For example, when the remainder is 0, the signal is R. Similarly, when 1, the G signal, and when 2, the B signal. As the result, a quasi-random pattern is established.

The operation of the arrangement shown in FIG. 11 will be described referring to a flowchart of FIG. 13.

Figure 13:
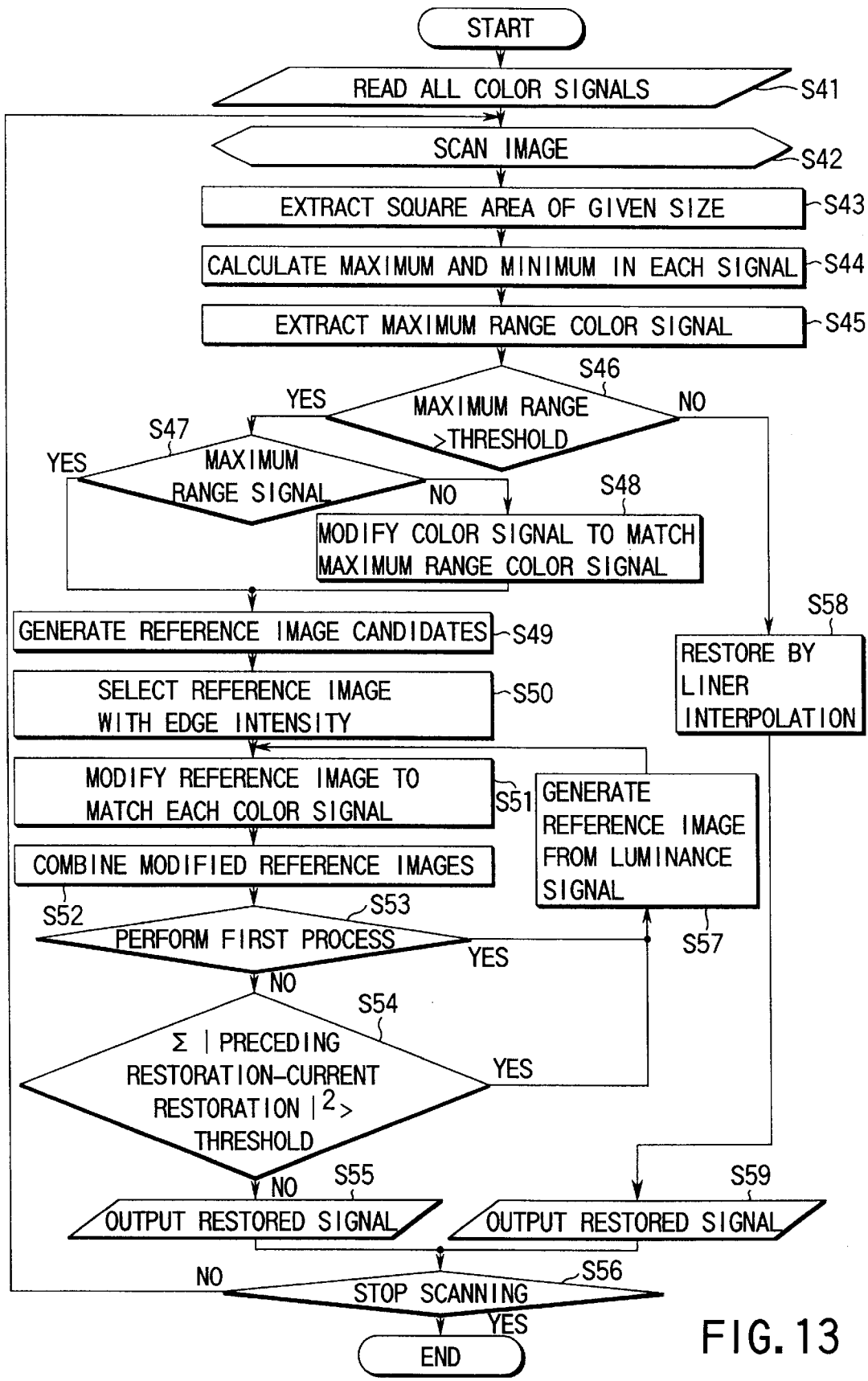
FIG. 13 is a flowchart explaining an operation of the arrangement illustrated in FIG. 11.

As shown in FIG. 13, three, R, G, and B, color signals of an image are read through the input section 501 by a control signal of the control section 524 and transferred to the R signal buffer 502, the G signal buffer 503, and the B signal buffer 504 respectively (Step S41). This is followed by the area extraction section 505 scanning the image in response to a control signal from the control section 524 (Step S42), extracting the color signals of the image, each signal attributed to the square area of a given size centered at a particular pixel, for example, 5×5 pixels, from their respective color signal buffers 502, 503, and 504 (Step S43) before transmitting to the R signal block buffer 506, the G signal block buffer 507, and the B signal block buffer 508 respectively. In response to a switching action of the RGB switch section 513, the color signals of the square area in the block buffers 506, 507, and 508 are delivered to the process switch section 514.

Simultaneously, the color signals are supplied to the R signal maximum/minimum calculation section 509, the G signal maximum/minimum calculation section 510, and the B signal maximum/minimum calculation section 511. The control section 524 holds the action of the process switch section 514 until the maximum/minimum calculation section 509, 510, and 511 and the maximum range signal selection section 512 have completed their actions. The maximum and minimum values of the color signal are calculated in each of the maximum/minimum calculation sections 509, 510, and 511 (Step S44) and delivered to the maximum range selection section 512. In the maximum range selection section 512, the range is determined from a difference between the maximum and the minimum to select one of the three color signals which has a maximum range (Step S45) which is then transferred to the process switch section 514 and the signal modifying section 517.

Upon receiving a control signal from the control section 524, the process switch section 514 starts its action when having received the maximum range signal from the maximum range signal selection section 512. More particularly, it is examined whether or not the range of the maximum range signal from the maximum range signal selection section 512 is greater than a predetermined threshold (for example, 32 or the like when the definition of the 10-bit signal ranges from 0 to 1023) (Step S46). When yes, the dropout pixel restoration section 516 is selected. If not as judged that the area of interest is rather plain, the linear interpolation section 515 is enabled.

The linear interpolation section 515 when enabled performs linear interpolation to restore dropout pixels of each color signal and supplies the output section 523 with a resultant restored signal (Steps S58 and S59). When the dropout pixel restoration section 516 is selected, the procedure goes to the action of the signal modifying section 517 in response to a control signal from the control section 524. In the signal modifying section 517, it is checked whether each signal input supplied from the process switch section 514 is a maximum range signal or not (Step S47). When not, the signal input is modified so that it matches to the maximum range signal (Step S48) and transferred to the candidate image generation section 518. When the input is a maximum range signal, it is directly sent to the candidate image generation section 518 without being modified.

The candidate image generation section 518, the candidate image buffer 519, and the reference image selection section 520 perform generating reference image candidates by the same manner as of the second embodiment (Step S49), and selecting the reference image over the edge intensity and sending it to the dropout pixel restoration section 516 (Step S50). In the dropout pixel restoration section 516, the reference images are modified to restore the dropout color signals which are then integrated (Steps S51 and S52).

It is then judged in the convergence determining section 521 whether the action is a first process or not (Step S53). When it is the first process, the restored color signal is transferred to the luminance signal generation section 522 with no conditions. In the luminance signal generation section 522, the luminance signal Y is produced from the R, G, and B color signals using the following equation.

$$Y=0.299R+0.587G+0.114B \tag{14}$$

The luminance signal Y produced using Equation (14) is higher in the edge localization since it is a composite signal of the R, G, and B colors of which variations are attenuated separately. The luminance signal Y of the luminance signal generation section 522 is then delivered as a new reference image to the dropout pixel restoration section 516 (Step S57). The dropout pixel restoration section 516 repeats the restoring action and supplies the convergence determining section 521 with a resultant restored signal. In the convergence determining section 521, the absolute values of differences between the previous restored signal and the current restored signal are summed over the square area and this summing operation is repeated until the sum is less than a certain threshold (Step S54). The threshold is determined depending on the size of the square area of interest and may be 10 for each pixel. When the sum is less than the threshold, it is judged that the process converges and the restored color signals are transmitted to the output section 523 (Step S55).

As all the images in the color signal buffers 502, 503, and 504 have been scanned and processed so that the square areas are not overlapped each other, dropouts in the images of one frame are restored (Step S56).

As set forth above, the third embodiment includes selecting a color signal which has a maximum range, determining the maximum and minimum values from the color signal to generate a reference image, and restoring dropouts of the color signal from the reference image. Then, another reference image is generated from the luminance component of the restored signal and used for carrying out a further restoring action. This is repeated until the restored image is convergent to a finite level. Accordingly, the reference image finally used is higher in the edge localization, thus contributing to the restoration of a higher fidelity image. Also, the restoring action is switched to and from linear interpolation corresponding to the range of a color signal and can hence be performed at a higher speed.

The selection of the color signal is not limited to the use of a maximum range defined by a difference between the maximum and the minimum in the third embodiment and may be conducted using another evaluation criteria such as variance or edge intensity. Also, the filter arrangement is not limited to that shown in FIG. 12 and may arbitrarily be designed so long as it is configured at random.

Figure 14:
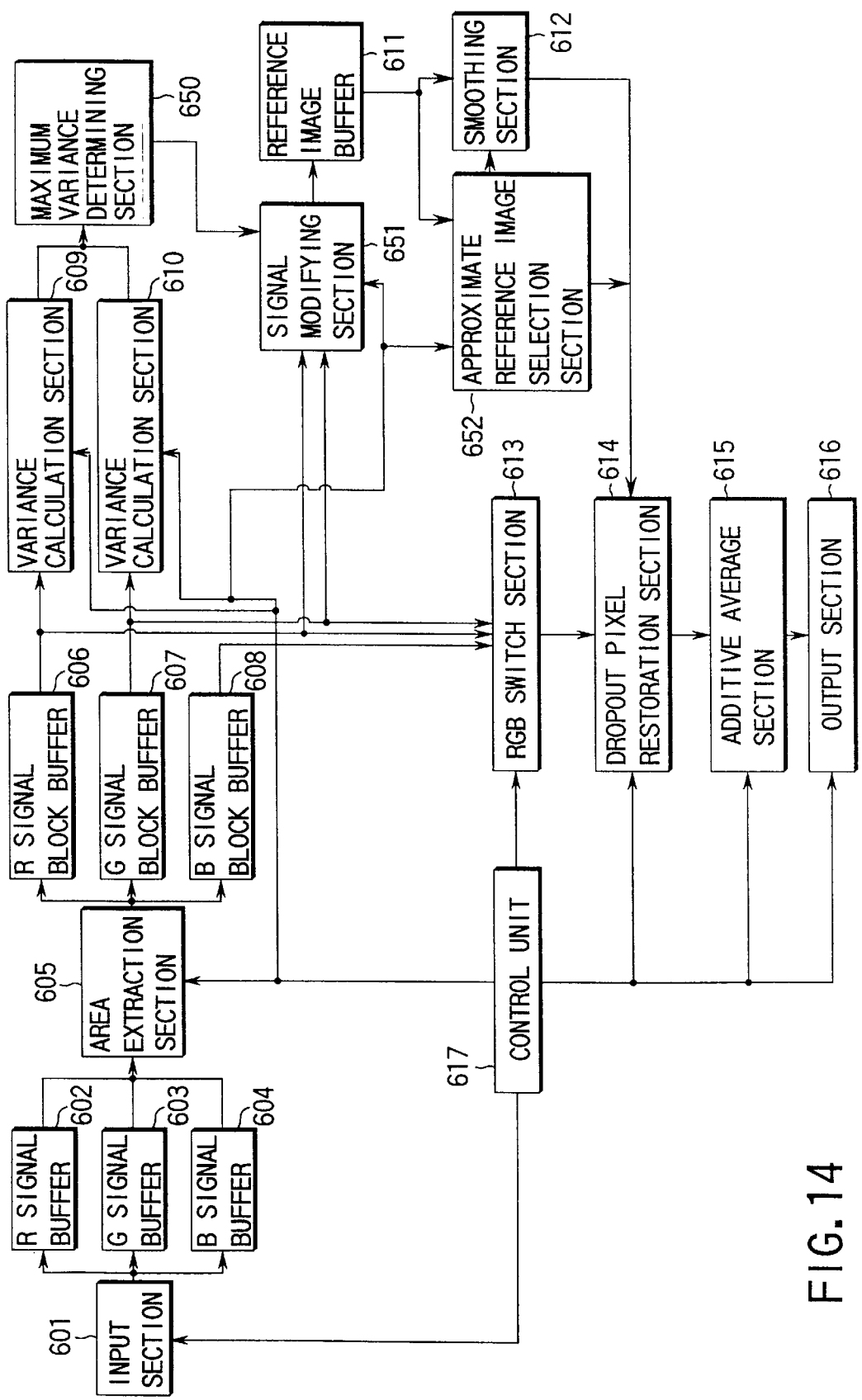
FIG. 14 is a functional block diagram of an image signal processor showing a fourth embodiment of the present invention.

FIG. 14 is a functional block diagram of an image signal processor showing a fourth embodiment of the present invention and its functions in connection are explained below.

As shown in FIG. 14, an input section 601 is connected to a group of an R signal buffer 602, a G signal buffer 603, and a B signal buffer 604 which in turn are connected via an area extraction section 605 to another group of an R signal block buffer 606, a G signal block buffer 607, and a B signal block buffer 608 respectively. The R signal block buffer 606 is connected to a variance calculation section 609, an RGB switch section 613, and a signal modifying section 651, the G signal block buffer 607 to a variance calculation section 610, the RGB switch section 613, and the signal modifying section 651, and the B signal block buffer 608 to the RGB switch section 613. The variance calculation sections 609 and 610 are also connected via a maximum variance determining section 650 to the signal modifying section 651.

The signal modifying section 651 is further connected via a reference image buffer 611 and an approximate reference image selection section 652 to a dropout pixel restoration section 614 and via the reference image buffer 611 and a smoothing section 612 to the dropout pixel restoration section 614. The approximate reference image selection section 652 is coupled to the smoothing section 612. The RGB switch section 613 is connected via the dropout pixel restoration section 614 and an additive average section 615 to an output section 616. A control section 617 is provided for connection to the input section 601, the area extraction section 605, the variance calculation sections 609 and 610, the signal modifying section 651, the approximate reference image selection section 652, the RGB switch section 613, the dropout pixel restoration section 614, the additive average section 615, and the output section 616.

FIG. 15 illustrates an arrangement of the signal modifying section 651, in which a selection section 651A which receives signals from the R signal block buffer 606, the G signal block buffer 607, the maximum variance determining section 650, and the control section 617, a gain/bias calculation section 651B, and an operation section 651C are connected in a succession.

The functions in the embodiment are partially made of hardware; the input section 601 comprises a single CCD, the output section 616 a magnetic disk unit, and the control section 617 a microcomputer.

Figure 6:
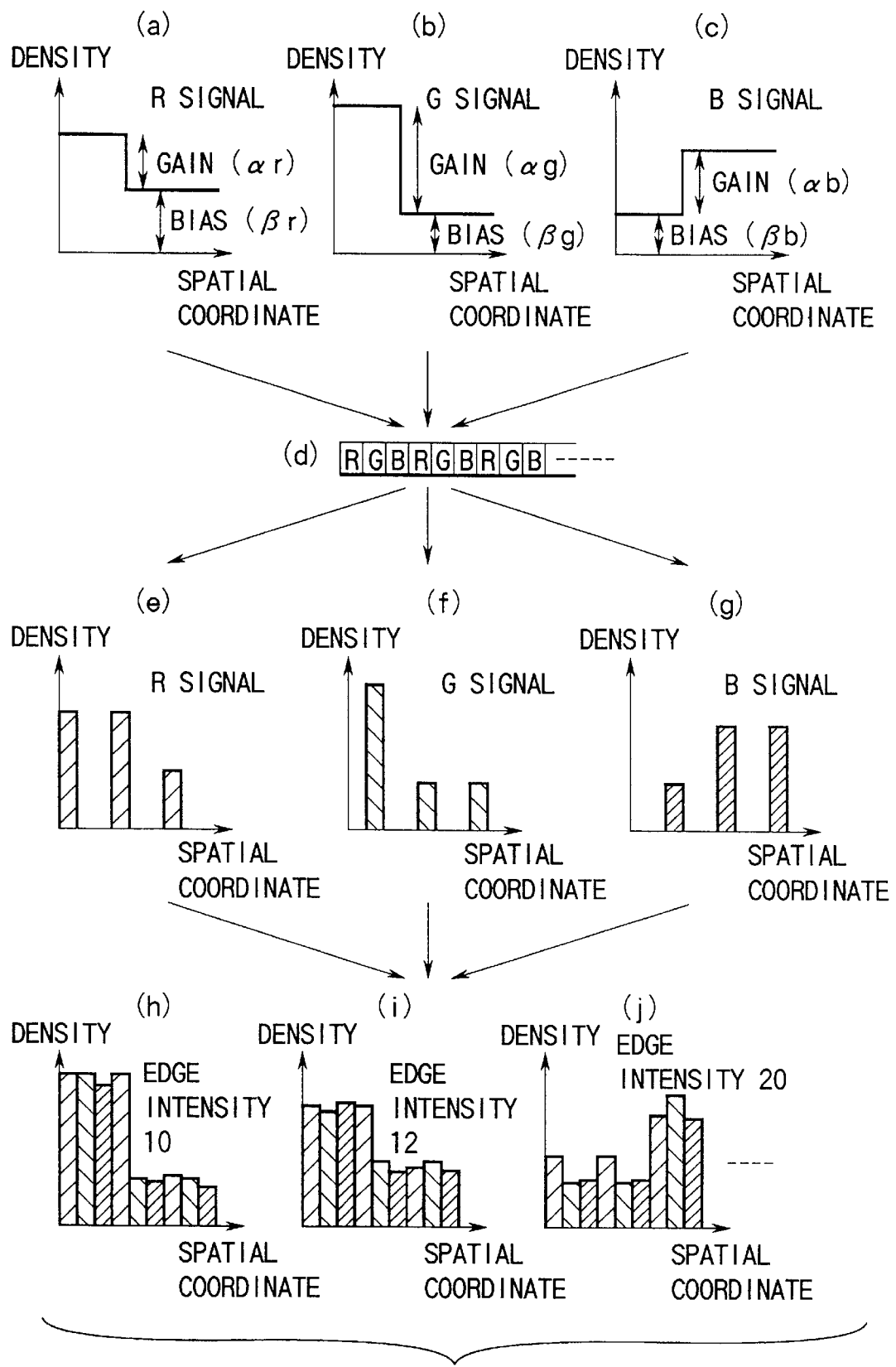
FIG. 6 is a diagram explaining a procedure of producing a reference image.

FIGS. 16A to 16D are some filter arrangements employed in the single CCD of the fourth embodiment. Two fundamental pixel segments are used including 4×2 pixels as shown in FIG. 16A and 6×3 pixels as shown in FIG. 16B. The entire CCD pixel arrangement is implemented by repeatedly aligning the fundamental segments. FIG. 16C shows an array of the fundamental segments illustrated in FIG. 16A and FIG. 16D shows an array of the fundamental segments illustrated in FIG. 16D.

In the fundamental segment of FIG. 16A, the ratio of the rate of appearance between the R, G, and B color signals is 3:3:2. In the fundamental segment of FIG. 16B, the same is 4:4:1. The rate of appearance is varied depending on the convergence in a lens system employed. As the aberrations in the lens system is increased, a high frequency component declines. For compensation, the rate of appearance of a corresponding color signal may be lowered. The rate of appearance of the color signal is adjustable according to the limits of the high frequency component calculated from the aberrations.

Figure 17:
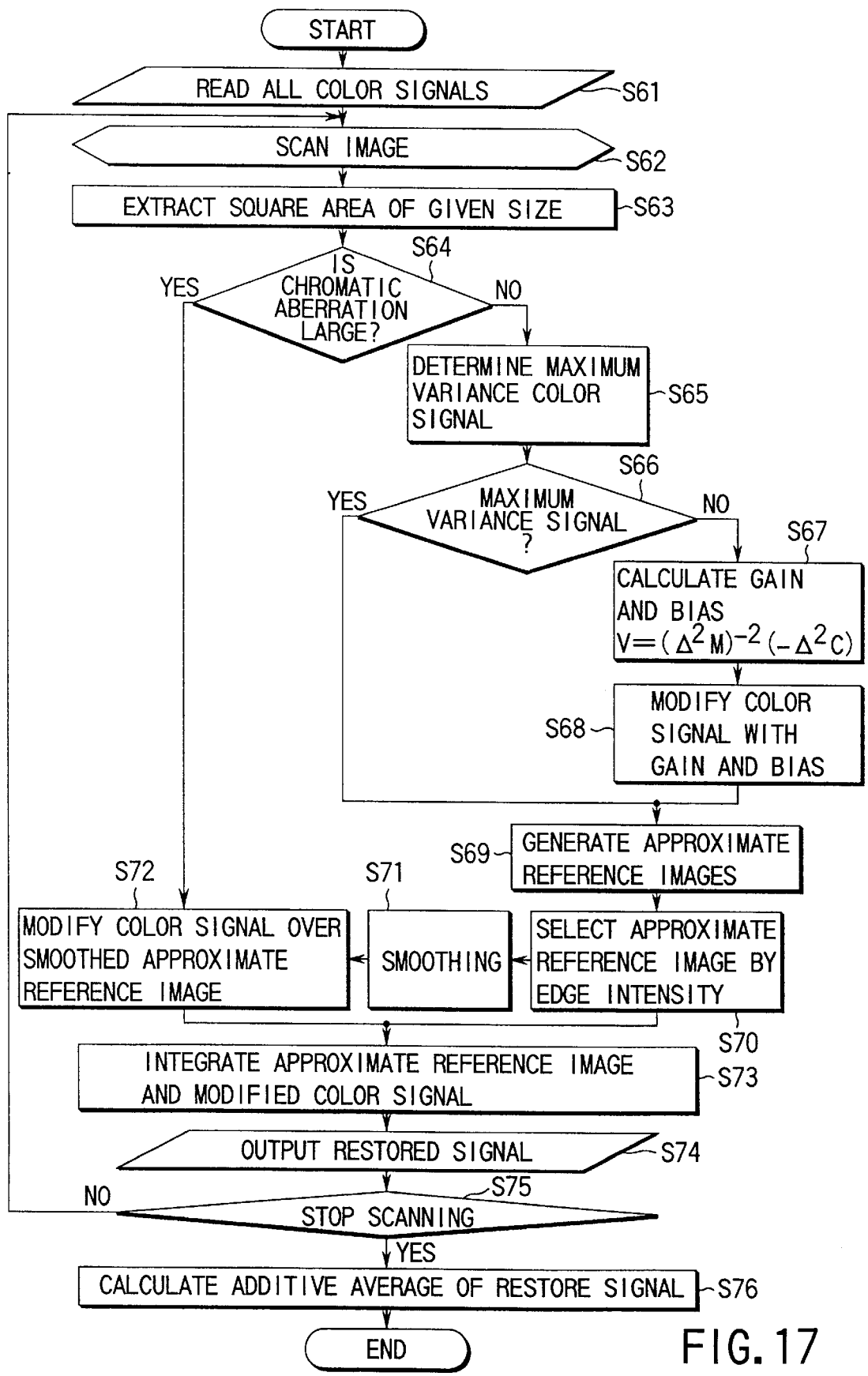
FIG. 17 is a flowchart explaining an operation of the arrangement illustrated in FIG. 14.

The operation of the arrangement shown in FIG. 14 will be described referring to a flowchart of FIG. 17.

It is assumed that the lens system in the input section 601 has large chromatic aberration, which introduces small defocus over the R and G signals but large defocus over the B signal. Also, the chromatic aberration and the defocus of in the lens system has been measured and recorded. Three, R, G, and B, color signals of an image are read through the input section 601 in response to a control signal of the control section 617 and transferred to the R signal buffer 602, the G signal buffer 603, and the B signal buffer 604 respectively (Step S61). This is followed by the area extraction section 605 in response to a control signal from the control section 617 scanning the image (Step S62), extracting signals of the three colors 602, 603, and each attributed to the square area of a given size centered at a particular pixel, for example, 7×7 pixels (Step S63), and transmitting them to the R signal block buffer 606, the G signal block buffer 607, and the B signal block buffer 608 respectively.

Upon receiving a control signal from the control section 617, the RGB switch section 613 retrieves the color signals of the square area from the block buffers 606, 607, and 608 and transmits them to the dropout pixel restoration section 614. It is then examined in the dropout pixel restoration section 614 whether or not the color signal transmitted is largely defocused (Step S64). When the defocus is large, the procedure jumps to Step S72. More specifically, when the color signal received is of B color which has a larger defocus, Step S72 follows. Otherwise, when the color signal is of R or G color which is small in the defocus, the procedure moves to Step S65.

The action is now shifted via the control section 617 to the variance calculation sections 609 and 610. The variance calculation sections 609 and 610 in response to a control signal from the control section 617 retrieves the color signals from the block buffers 606 and 607 to calculate degrees of variance in the color signals. One of the color signals which is highest in the variance is then selected in the maximum variance determining section 650 (Step S65).

Upon receiving a control signal from the control section 617, the selection section 651A (FIG. 15) in the signal modifying section 651 selects each of the color signals of the square area from the block buffers 606 and 607 and examines whether the color signal is the signal selected in the maximum variance section (Step S66). The maximum variance color signal from the block buffer 606 or 607 is directly transferred to the reference image buffer 611 without being modified. The other color signal than the maximum variance signal is then fed to the gain/bias calculation section 651B where a gain $\alpha_i$ and a bias $\beta_i$ of the color signal received are calculated (Step S67) and delivered together with the color signal to the operation section 651C. In the operation section 651C, the color signal is modified using the gain $\alpha_i$ and the bias $\beta_i$ before transmitted to the reference image buffer 611 (Step S68). The modified and unmodified maximum variance color signals are integrated in the reference image buffer 611 to generate approximate reference images (Step S69).

The approximate reference images are then transferred to the smoothing section 612 and the approximate reference images selection section 652. In the approximate reference image selection section 652, the approximate reference image is selected on the basis of edge intensity by the same manner as of the first embodiment (Step S70) and delivered further to the smoothing section 612 and the dropout pixel restoration section 614. In the smoothing section 612, the approximate reference image is smoothed depending on the defocus of the B color signal in the lens system to have a smoothed approximate reference image which is transmitted to the dropout pixel restoration section 614 (Step S71).

The dropout pixel restoration section 614 modifies the shape of the B signal read through the RGB switch section 613 corresponding to the smoothed approximate reference image (Step S72). The modified color signal and the approximate reference image are integrated to have a reference image (Step S73). Dropouts in the color signal are then restored correspond to the reference image and a restored signal is given to the additive average section 615 (Step S74).

Accordingly, as all the images in the color signal buffers 602, 603, and 604 have been scanned and all the square areas contained in the image region processed (Step S75), dropouts in the image are repeatedly restored and transferred to the additive average section 615. More specifically, assuming that the square area comprises 7×7 pixels, the additive average section 615 receives 49 restored color signals per pixel except for the portion near the image border. In the additive average section 615, an additive average of the color signals are calculated (Step S76) and released to the output section 616.

Figure 18:
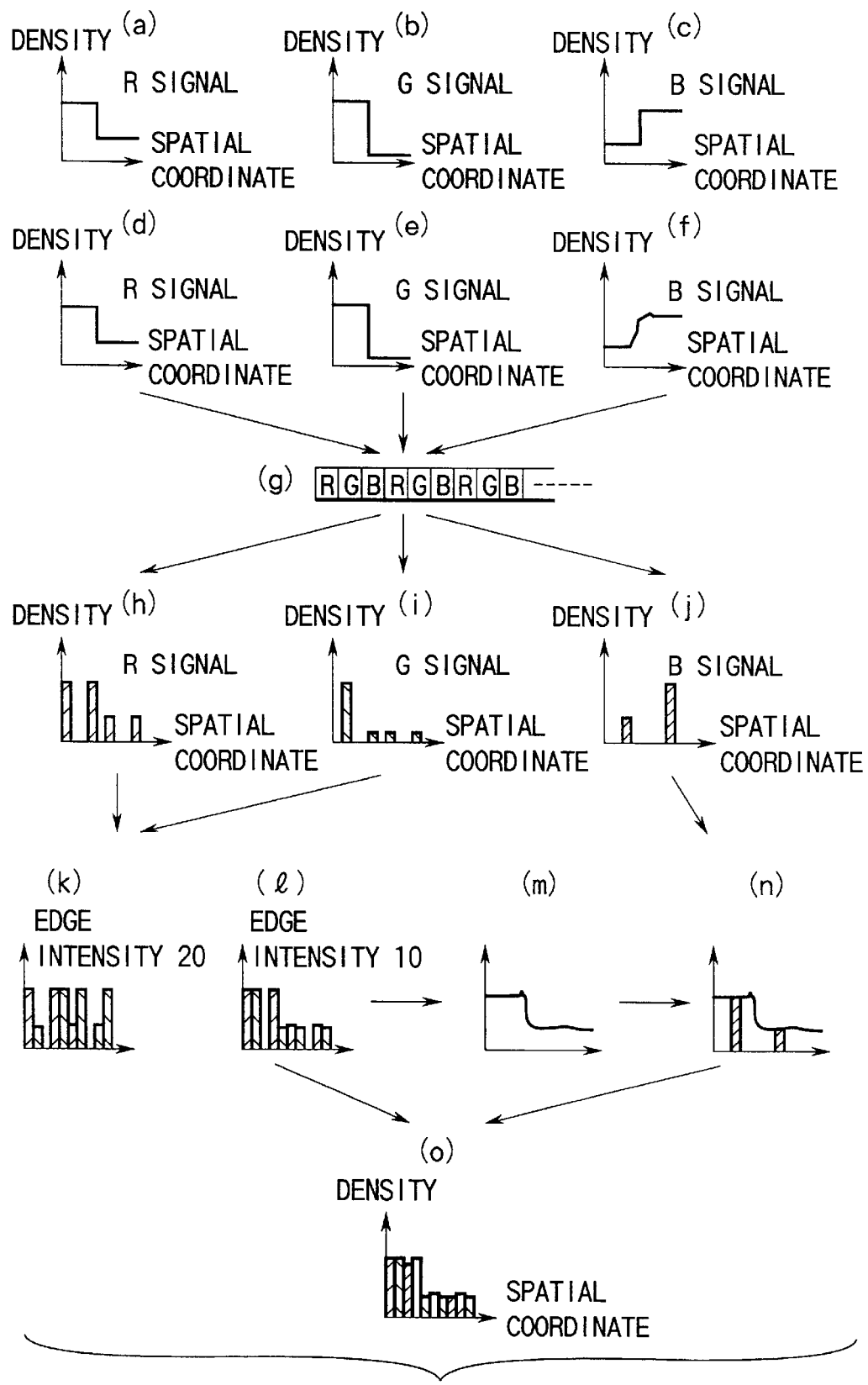
FIG. 18 is a diagram explaining a procedure of restoring dropout pixels in reference to a color edge model when chromatic aberration exists.
Figure 19:
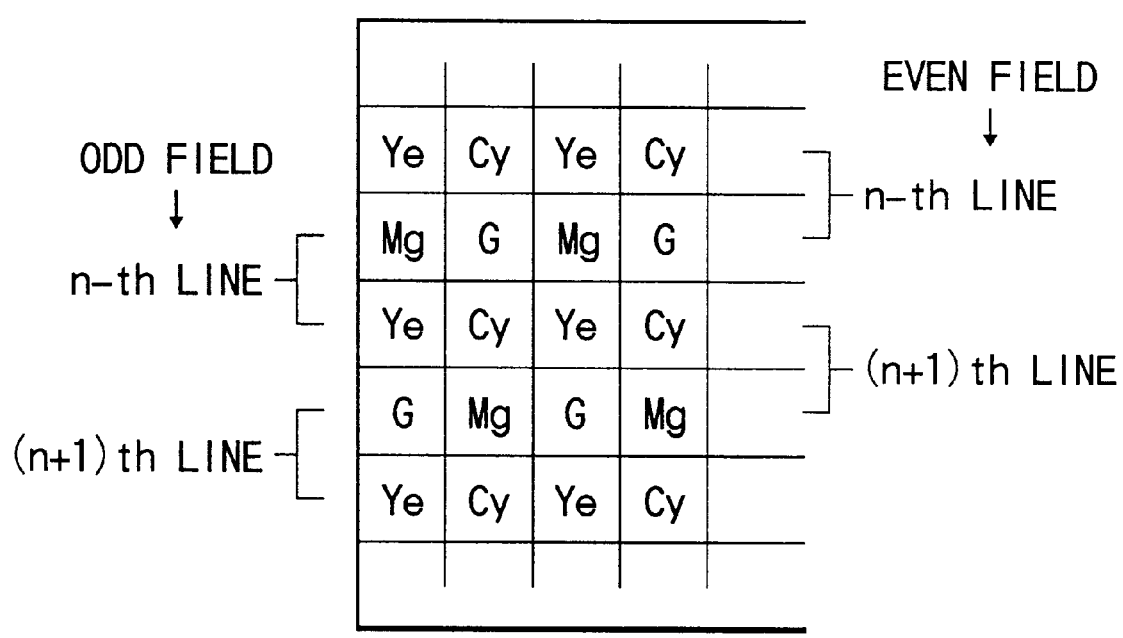
FIG. 19 is an explanatory view showing an array of filters of a conventional single chip image pickup element.

FIGS. 18($a$) to 18($o$) are explanatory diagrams showing the restoration of dropout pixels using a color edge model under the existence of color aberration. The following description is based on a one dimensional pattern. FIGS. 18($a$), 18($b$), and 18($c$) illustrate the R, G, and B color signals respectively derived from an original image. FIGS. 18($d$), 18($e$), and 18($f$) show declination in the R, G, and B signals respectively produced through a lens system having a pertinent color aberration. It is apparent that the B color signal exhibits a degree of defocus. As the image is taken by a single CCD having a filter arrangement shown in FIG. 18($g$), the resultant three color signals are profiled as shown in FIGS. 18($h$), 18($i$), and 18($j$).

The same manner as of the first embodiment is now used for adjusting the gain and the bias of the R signal shown in FIG. 18($h$) and of the G signal shown in FIG. 18($i$) and thus calculating the estimates of a underlying edge structure in FIGS. 18($k$) and 18($l$). One of these estimates which is highest in the edge localization or lowest in the edge intensity is then selected as a reference image. The selected reference image however includes dropout of the B color pixels and is not a perfect image as termed the approximate reference image.

The approximate reference image is then smoothed corresponding to a degree of defocus to have a smoothed approximate reference image such as shown in FIG. 18($m$). The gain and the bias of the B color signal are calculated from the smoothed approximate reference image and used for modifying the B signal shown in FIG. 18($j$) to a shape shown in FIG. 18($n$). The modified B signal shown in FIG. 18($n$) is then combined with the approximate reference image of a small edge intensity shown in FIG. 18($l$) to produce a final reference image shown in FIG. 18($o$). The succeeding restoration steps are identical to those of the first embodiment.

As set forth above, the fourth embodiment starts with developing an approximate reference image with the smaller defocus color signals. The reference image is then smoothed to have a preferable reference image through adjusting with the largely defocused color signal. The preferable reference image is used to restore dropouts in the color signals. Accordingly, when an inexpensive lens system is used, the restoration of a higher fidelity image will be ensured. Also, the rate of appearance is balanced between the R, G, and B color signals depending on their degrees of color aberration, whereby the efficiency of imaging will be improved.

The assignment of chromatic aberration is not limited to the B color signal in the embodiment but may be to any other color signal. A. As featured in the foregoing embodiments, the present invention is implemented in the following forms.

(1) An image signal processor for processing an image signal where each pixel is composed of more than one color signals and at least one of the color signals are dropped out according to the location of the pixel, comprising:

an extracting means for extracting from the image signal the color signals of a local area of a predetermined size which includes a desired pixel;

a reference image generating means for modifying and combining the color signals of the local area extracted by the extracting means on the basis of a structure model and an evaluation function to generate a reference image; and a restoring means for restoring the dropout color signal with the use of the reference image generated by the reference image generating means.

(2) An image signal processor according to clause (1), wherein the reference image generating means employs as the structure model a color edge model in which the color signals have a common edge pattern.

(3) An image signal processor for processing an image signal where each pixel is composed of more than one color signals and at least one of the color signals are dropped out according to the location of the pixel, comprising:

an extracting means for extracting from the image signal the color signals of a local area of a predetermined size which includes a desired pixel;

a color signal selecting means for calculating parameters from each of the color signals of the local area extracted by the extracting means and selecting one of the color signals according to the parameters;

a modifying means for modifying the shape of the other color signals than the selected color signal so that their parameters are equal to the parameters of the selected color signal;

a candidate image generating means for combining the other modified color signals modified by the modifying means and the selected color signal selected by the color signal selecting means to generate reference image candidates;

a reference image selecting means for selecting as a reference image one of the reference image candidates generated by the candidate image generating means on the basis of a given evaluation function; and a restoring means for restoring the dropout color signal with the use of the reference image determined by the reference image selecting means.

(4) An image signal processor according to clause (3), wherein the color signal selecting means and the modifying means exploit average and variance or maximum and minimum in the color signals as parameters to be calculated.

(5)-1 An image signal processor according to clause (1) or (2), wherein the reference image generating means exploits edge intensity calculated by Laplacian operation of each color signal, or energy, entropy, correlation, local uniformity, or moments given from density co-occurrence matrix for the evaluation function.

(5)-2 An image signal processor according to clause (3), wherein the reference image generating means exploits edge intensity calculated by Laplacian operation of each color signal, or energy, entropy, correlation, local uniformity, or moments given from density co-occurrence matrix for the evaluation function.

(6)-1 An image signal processor according to clause (3), further comprising a selecting means for examining the color signal, which is an output of the extracting means, over a given evaluation criteria to select either a combination of the color signal selecting means defined in clause (3) and its succeeding processing means or a linear interpolation restoring means for processing the color signal.

(6)-2 An image signal processor according to clause (1) or (2), further comprising a selecting means for examining the color signal, which is an output of the extracting means, over a given evaluation criteria to select either a combination of the reference image generating means defined in clause (1) and its succeeding processing means or a linear interpolation restoring means for processing the color signal.

(6)-11 An image signal processor according to clause (6)-1, wherein the examination over the given evaluation criteria includes calculating edge intensity, variance, or maximum/minimum in the color signal which is an output of the extracting means, and comparing a calculated result with a predetermined threshold.

(6)-12 An image signal processor according to clause (6)-2, wherein the examination over the given evaluation criteria includes calculating edge intensity, variance, or maximum/minimum in the color signal which is an output of the extracting means, and comparing a calculated result with a predetermined threshold.

(7) An image input processor according to any of clauses (1) to (3), further comprising an input means having an imaging element for taking an image of an object to produce the color signals, the imaging element including an array of color filters, each color filter allocated to each pixel for the color signal, which is spatially arranged by repeatedly aligning square areas of an m×n pixel size where m and n are integers of three or higher, the square area designed so that the rate of appearance is equal among the different color signals.

(8) An image input processor according to any of clauses (1) to (3), further comprising an input means having an imaging element for taking an image of an object to produce the color signals, the imaging element including an array of color filters, each color filter allocated to each pixel for the color signal, which is spatially arranged by repeatedly aligning square areas of an jk×jk pixel size where j is the number of the color signals used and k is an integer of two or higher, the square area designed so that the rate of appearance is equal among the different color signals and the number of the appearance of each color signals are particularly designated to be larger than two and small than j in the horizontal and vertical directions.

(9) An image input processor according to any of clauses (1) to (3), further comprising an input means having an imaging element for taking an image of an object to produce the color signals, the imaging element including an array of color filters, each color filter allocated to each pixel for the color signal, which is spatially arranged by repeatedly aligning square areas of an jk×jk pixel size where j is the number of the color signals used and k is an integer of two or higher, the square area designed so that the rate of appearance is equal among the different color signals and that the arrangement of the color filters is defined by a remainder of the distance between a particular point in the square area and the integer coordinate point divided by j.

(10) An image signal processor according to any of clauses (1) to (3), wherein the restoring means includes a luminance signal generating means for generating a luminance signal from each the color signal restored corresponding to the reference image, and a convergence determining means for repeating a restoring process with the luminance signals through reviewing a profile of the luminance signals.

(11) An image input processor for processing an image signal where each pixel is composed of more than one color signals and at least one of the color signals are dropped out according to the location of the pixel, comprising:

an input means including an optical lens system where chromatic aberration occurs and an imaging element where the rate of appearance of the color signals is adjusted based on the amount of their aberration;

an extracting means for extracting from the image signal produced by the input means color signals of a local area of a predetermined size including a desired pixel;

an approximate reference image generating means for modifying and combining color signals which have a low degree of the chromatic aberration on the basis of a structure model and an evaluation function to generate an approximate reference image;

a smoothing means for smoothing the approximate reference image generated by the approximate reference image generating means in accordance with a degree of the chromatic aberration of a high aberration color signal; and a restoring means for generating a reference image from the approximate reference image generated by the approximate reference image generating means and the smoothed approximate reference image generated by the smoothing means and using it to restore the dropout color signal.

(12) An image input processor according to clause (11) wherein the approximate reference image generating means employs as the structure model a color edge model in which the color signals have a common edge pattern.

(13) An image input processor according to clause (12), wherein the approximate reference image generating means exploits edge intensity calculated by Laplacian operation of each color signal, or energy, entropy, correlation, local uniformity, or moments given from density co-occurrence matrix for the evaluation function.

B. The description is made of "best mode for embodying the invention", "operation", and "advantages" according to the features of the present invention defined in clauses (1) to (13).

Clauses (1), (2), (5)-1 and -2, (6)-1, -2, -11, and -12, and (7).

Best Mode for Embodying the Invention

This mode incorporates at least the first embodiment. The input means includes the CCD 203, shown in FIG. 3, which has a spatial arrangement of color filters based on the square area of an m×n pixel size where m and n are integers of three or higher. The rate of appearance is set equal between the different color signals of the square area. The extracting means is the area extraction section 105 shown in FIG. 1. The reference image generating means includes the variance calculation sections 109, 110, 111, the maximum variance determining section 150, the signal modifying section 151, and the reference image buffer 112 shown in FIG. 1. The structure model may be a color edge model in which the different color signals has a common edge pattern. The evaluation function may be edge intensity calculated by the Laplacian operation of each color signal, or energy, entropy, correlation, local uniformity, or moments given from the density co-occurrence matrix. The restoring means includes the edge intensity calculation section 114 and the linear interpolation section 115 both acting as a switching section, and the dropout pixel restoration section 116. The edge intensity calculation section 114 switches between the linear interpolation section 115 and the dropout pixel restoration section 116 according to an evaluation criteria such as edge intensity, variance, or maximum/minimum.

This feature is activated in the following manner. The image signal is read through the input section 101 and saved in the R signal buffer 102, the G signal buffer 103, and the B signal buffer 104 as shown in FIGS. 1, 3, and 4. The color signals of the sized square area are then extracted from the image signal by the area extraction section 105 and transferred to the R signal block buffer 106, the G signal block buffer 107, and the B signal block buffer 108 respectively. The edge intensity calculation section 114 selects either the linear interporation section 115 or the dropout pixel restoration section 116 according to the edge intensity in the color signals from the R signal block buffer 106, the G signal block buffer 107, and the B signal block buffer 108. When the linear interpolation section 115 is selected, it performs a known linear interpolation operation to restore the dropouts of signal which are then transmitted to the output section 117. When the dropout pixel restoration section 116 is selected, the signal modifying section 151 in response to data of the maximum variance from the maximum variance determining section 150 modifies the shape of each the color signal corresponding to the color edge model shown in FIG. 6. The modified color signals are combined and saved in the reference image buffer 112, generating a reference image. The dropouts in the signals are then restored in the dropout pixel restoration section 116 according to the reference image and transferred to the output section 117.

Operation

The restoring action is switched between the conventional linear interpolation and the use of the structure model depending on the edge intensity of each color signal. When the restoration using the structure model is selected, the reference image is produced from the color edge model and utilized for restoring the dropouts in the color signal.

Advantages

In the restoration using the structure model, the reference image is generated from the color signals in an extended area ranging from 5×5 to 15×15 pixels. This allows dropout pixels to be restored at as a high fidelity as with a triple CCD imaging system. Also, the conventional linear interpolation is carried out over a flat area determined by calculating the edge intensity, thus contributing to the high speed of the overall signal processing.

Clauses (3), (4), and (5)-1 and -2.

Best Mode for Embodying the Invention

This mode incorporates at least the second embodiment. The extracting means is the area extraction section 305 shown in FIG. 8. The signal selecting means includes the R signal average/variance calculation section 309, the G signal average/variance calculation section 310, the B signal average/variance calculation section 311, and the maximum variance signal selection section 312 shown in FIG. 8. The modifying means is the signal modifying section 313. In the extracting means and the modifying means, the extraction and modification of the color signals are performed according to the average and the variance. The extraction and modification may be conducted according to the maximum and the minimum. The candidate image generating means is the candidate image generation section 314 shown in FIG. 8. The reference image selecting means is the reference image selection section 316 shown in FIG. 8. The evaluation function may be edge intensity calculated by the Laplacian operation of each color signal, or energy, entropy, correlation, local uniformity, or moments given from the density co-occurrence matrix. The restoring means is the dropout pixel restoration section 318 shown in FIG. 8.

This feature is activated in the following manner. The image signal is read through the input section 301 and saved in the R signal buffer 302, the G signal buffer 303, and the B signal buffer 304 as shown in FIGS. 8 and 9. The color signals of the sized square area are then extracted from the image signal by the area extraction section 305 and transferred to the R signal block buffer 306, the G signal block buffer 307, and the B signal block buffer 308 respectively. The R signal average/variance calculation section 309, the G signal average/variance calculation section 310, the B signal average/variance calculation section 311 retrieve the color signals from their respective block buffers 306, 307, and 308 to calculate the average and the variance. As the maximum variance signal selection section 312 selects the color signal having a maximum variance, the signal modifying section 313 modifies the other signals than the maximum variance signal so that they are equal in the average and the variance to the maximum variance signal. In the candidate image generation section 314, a plurality of candidate images are produced through combining the maximum variance color signal and the modified color signals. The reference image selection section 316 selects as a reference image one of the candidate images according to the edge intensity. The dropouts in the color signals are then restored in the dropout pixel restoration section 318 according to the selected reference image and transferred to the output section 319.

Operation

A plurality of the reference image candidates are generated by selecting one of the different color signals which has a maximum variance, modifying the shape of the other color signals for matching the maximum variance color signal, and combining those color signals. Then, the reference image is selected from the reference image candidates according to the edge intensity and used to restore the dropout pixel.

Advantages

Since the combination of modifying color signals to agree with the maximum variance color signal and the selection of the reference image over the edge intensity contribute to the minimum of calculating operations, the generation of the reference image will be performed at a higher speed. Also, the reference signal is generated using the color signals in an extended area ranging from 5×5 to 15×15 pixels. This allows dropout pixels to be restored at as a high fidelity as with a triple CCD imaging system.

Clauses (3), (4), (5)-1 and -2, (6)-1, -2, -11, and -12, (8), (9), and (10).

Best Mode for Embodying the Invention

This mode incorporates at least the third embodiment. The input means includes a CCD which may have a spatial arrangement of color filters based on the square area of a jk×jk pixel size where j is the number of the color signals used and k is an integer of two or higher. The square area is so designed that the frequency of appearance is uniform between the different color signals and that the arrangement of the color filters is defined by a remainder of the distance between a particular point in the square area and an integer coordinate point divided by j.

The extracting means is the area extraction section 505 shown in FIG. 11. The signal selecting means includes the R signal maximum/minimum calculation section 509, the G signal maximum/minimum calculation section 510, the B signal maximum/minimum calculation section 511, and the maximum range signal selection section 512 shown in FIG. 11. The modifying means is the signal modifying section 517 shown in FIG. 11. In the extracting means and the modifying means, the extraction and modification of the color signals are performed according to the maximum and the minimum. The extraction and modification may be conducted according to the average and the variance. The candidate image generating means is the candidate image generation section 518 shown in FIG. 11. The reference image selecting means is the reference image selection section 520 shown in FIG. 11. The evaluation function may be edge intensity calculated by the Laplacian operation of each color signal, or energy, entropy, correlation, local uniformity, or moments given from the density co-occurrence matrix. The restoring means includes the process switch section 514, the linear interpolation section 515, the dropout pixel restoration section 516, the convergence determining section 521, and the luminance signal generation section 522 shown in FIG. 11. The process switch section 514 selects either the linear interpolation section 515 or the dropout pixel restoration section 516 depending on the evaluation criteria such as edge intensity, variance, or maximum/minimum. The luminance signal generation section 522 generates the luminance signal from the restored color signal in accordance with the reference image and the convergence determining section 521 repeats the restoring process with the luminance signals through reviewing a profile of the luminance signals.

This feature is activated in the following manner. The image signal is read through the input section 501 and saved in the R signal buffer 502, the G signal buffer 503, and the B signal buffer 504 as shown in FIG. 11. The color signals of the sized square area are then extracted from the image signal by the area extraction section 505 and transferred via the R signal block buffer 506, the G signal block buffer 507, and the B signal block buffer 508 to the R signal maximum/minimum calculation section 509, the G signal maximum/minimum calculation section 510, and the B signal maximum/minimum calculation section 511 respectively. As the maximum and the minimum have been calculated, the color signal which has a maximum range (=maximum−minimum) is then selected in the maximum range selection section 512 and transmitted to the process switch section 514. The process switch section 514 selects either the linear interpolation section 515 or the dropout pixel restoration section 516 depending on the maximum range. When the linear interpolation section 515 is selected, dropout pixels are restored by the conventional linear interpolation and transferred to the output section 523. When the dropout pixel restoration section 516 is selected, the other color signals than the maximum range color signal are modified by the signal modifying section 517 so that they are equal in the maximum and minimum to the maximum range signal. In the candidate image generation section 518, the modified color signals are combined with the maximum range color signal to generate the reference image candidates. One of the reference image candidates is selected by the reference image selection section 520 according to the edge intensity. The dropouts pixels are restored corresponding to the reference image in the dropout pixel restoration section 516 and transmitted to the convergence determining section 521. In the convergence determining section 521, the restoration of the color signal is made with no conditions at the first cycle and at the second and higher cycles is continued until a sum of squares of the absolute value of a difference between the previously restored image and the currently restored image over the square area is smaller than a predetermined threshold. A resultant restored color signal is then delivered to the luminance signal generation section 522 where it is used to generate the luminance signal. The luminance signal is supplied to as a reference image and causes the dropout pixel restoration section 516 to repeat the restoring action. The restored color signal generated when the sum of squares of the absolute value of a difference between the previously restored image and the currently restored image over the square area is smaller than the predetermined threshold is hence transferred to the output section 523.

Operation

A plurality of the reference image candidates are generated by selecting one of the different color signals which has a maximum range, modifying the shape of the other color signals for matching the maximum range color signal, and combining those color signals. Then, the reference image is selected from the reference image candidates according to the edge intensity and used to restore the dropout pixel. The restored image is then utilized to generate the luminance signal. The restoring action is repeated based on the luminance signal until a change from the previously restored image is smaller than the threshold.

Advantages

Since the combination of modifying the color signals to agree with the maximum range color signal and the selection of the reference image over the edge intensity contribute to the minimum of calculating operations, the generation of the reference image will be performed at a higher speed. Also, the reference signal is generated using the color signals in an extended area ranging from 5×5 to 15×15 pixels. This allows dropout pixels to be restored at as a high fidelity as with a triple CCD imaging system. Moreover, the restoring action with the luminance signal is repeated and the restoration of dropout pixels will be increased in the fidelity.

Clauses (11), (12), and (13).

Best Mode for Embodying the Invention

This mode incorporates at least the fourth embodiment. The input means is the input section 601 shown in FIG. 14. Then extracting means is the area extraction section 605 shown in FIG. 14. The approximate reference image generating means includes the variance calculation sections 609 and 610, the maximum variance determining section 650, the signal modifying section 651, and the reference image buffer 611 shown in FIG. 14. The structure model may be a color edge model in which the different color signals has a common edge pattern. The evaluation function may be edge intensity calculated by the Laplacian operation of each color signal, or energy, entropy, correlation, local uniformity, or moments given from the density co-occurrence matrix. The smoothing means is the smoothing section 612 of FIG. 14. The restoring means includes the dropout pixel restoration section 614 and the additive average section 615 shown in FIG. 14.

This feature is activated in the following manner. The image signal is read through the input section 601 and saved in the R signal buffer 602, the G signal buffer 603, and the B signal buffer 604 as shown in FIGS. 14 and 16. The color signals of the sized square area are then extracted from the image signal by the area extraction section 605 and transferred to the R signal block buffer 606, the G signal block buffer 607, and the B signal block buffer 608 respectively. In the variance calculation sections 609 and 610, degrees of the variance of the R and G signals respectively. The color signal which has a maximum variance is determined by the maximum variance determining section 650. In the signal modifying section 651, the shape of the either R and G color signals which has smaller variance is modified according to the gain and the bias of the maximum variance color signal. The modified color signals are then combined in the reference image buffer 611 producing the approximate reference image. In the smoothing section 612, the approximate reference image is smoothed corresponding to the chromatic aberration. The dropout pixel restoration section 614 generates the reference image from the approximate reference image and the smoothed approximate reference image and utilizes it to restore the dropout pixels. The additive average section 615 subjects a series of the restored color signals of the overlapped square areas to additive average operation and delivers its result to the output section 616.

Operation

The approximate reference image is generated by selecting one of the input color signals which has small chromatic aberration, the input color signal supplied from the imaging element in which degrees of the rate of appearance of the difference color signals are adjusted depending on the amount of their chromatic aberration, and comparing it with the structure model. The approximate reference image is then smoothed according to the defocus of the particular color signal which has larger chromatic aberrations and used to modify the shape of the large chromatic aberration signal. The approximate reference image and the modified large chromatic aberration signal are combined together to develop the reference image which is then utilized to restore the dropout pixels.

Advantages

While the small chromatic aberration signal is directly subjected to the structure model, the large chromatic aberration signal is smoothed and then subjected to the structure model. This allows the reference image to be generated by referring all the color signals hence contributing to the highly accurate restoration of color dropouts. Also, this allows an inexpensive lens system where the color aberration is large to be employed for successful restoration of the color dropouts, hence reducing the overall cost of the apparatus.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

We claim:

1. An image signal processor for processing an image signal where each pixel is composed of more than one color signals and at least one of the color signals are dropped out according to the location of the pixel, comprising:

an extracting unit for extracting from the image signal the color signals of a local area of a predetermined size which includes a desired pixel;

a reference image generating unit for modifying and combining the color signals of the local area extracted by the extracting unit on the basis of a structure model and an evaluation function to generate an intermediate reference image, said structure model being commonly established for most applicable images in nature; and a restoring unit for restoring the dropout color signal with the use of the intermediate reference image generated by the reference image generating unit.

2. An image signal processor according to claim 1, wherein the reference image generating unit employs as the structure model a color edge model in which the color signals have a common edge pattern.

3. An image signal processor for processing an image signal where each pixel is composed of more than one color signals and at least one of the color signals are dropped out according to the location of the pixel, comprising:

an extracting unit for extracting from the image signal the color signals of a local area of a predetermined size which includes a desired pixel;

a color signal selecting unit for calculating a parameter from each of the color signals of the local area extracted by the extracting unit and selecting one of the color signals according to the parameter;

a modifying unit for modifying the shape of the other color signals than the selected color signal so that their parameters are equal to the parameter of the selected color signal;

a candidate image generating unit for combining the other modified color signals modified by the modifying unit and the selected color signal selected by the color signal selecting unit to generate reference image candidates;

a reference image selecting unit for selecting as a reference image one of the reference image candidates generated by the candidate image generating unit on the basis of a given evaluation function; and a restoring unit for restoring the dropout color signal with the use of the reference image determined by the reference image selecting unit.

4. An image signal processor according to claim 3, wherein the color signal selecting unit and the modifying unit exploit average and variance or maximum and minimum in the color signals as parameters to be calculated.

5. An image signal processor according to claim 1, wherein the reference image generating unit exploits edge intensity calculated by Laplacian operation of each color signal, or energy, entropy, correlation, local uniformity, or moments given from density co-occurrence matrix for the evaluation function.

6. An image signal processor according to claim 2, wherein the reference image generating unit exploits edge intensity calculated by Laplacian operation of each color signal, or energy, entropy, correlation, local uniformity, or moments given from density co-occurrence matrix for the evaluation function.

7. An image signal processor according to claim 3, wherein the reference image generating unit exploits edge intensity calculated by Laplacian operation of each color signal, or energy, entropy, correlation, local uniformity, or moments given from density co-occurrence matrix for the evaluation function.

8. An image signal processor according to claim 3, further comprising a selecting unit for examining the color signal, which is an output of the extracting unit, over a given evaluation criteria to select either the color signal selecting unit or a linear interpolation restoring unit for processing the color signal.

9. An image signal processor according to claim 1, further comprising a selecting unit for examining the color signal, which is an output of the extracting unit, over a given evaluation criteria to select either the reference image generating unit or a linear interpolation restoring unit for processing the color signal.

10. An image signal processor according to claim 2, further comprising a selecting unit for examining the color signal, which is an output of the extracting unit, over a given evaluation criteria to select either the reference image generating unit or a linear interpolation restoring unit for processing the color signal.

11. An image signal processor according to claim 8, wherein the examination over the given evaluation criteria includes calculating edge intensity, variance, or maximum/minimum in the color signal which is an output of the extracting unit, and comparing a calculated result with a predetermined threshold.

12. An image signal processor according to claim 9, wherein the examination over the given evaluation criteria includes calculating edge intensity, variance, or maximum/minimum in the color signal which is an output of the extracting unit, and comparing a calculated result with a predetermined threshold.

13. An image signal processor according to claim 10, wherein the examination over the given evaluation criteria includes calculating edge intensity, variance, or maximum/minimum in the color signal which is an output of the extracting unit, and comparing a calculated result with a predetermined threshold.

14. An image input processor according to claim 1, further comprising an input unit having an imaging element for taking an image of an object to produce the color signals, the imaging element including an array of color filters, each color filter allocated to each pixel for the color signal, which is spatially arranged by repeatedly aligning square areas of an m×n pixel size where m and n are integers of three or higher, the square area designed so that the rate of appearance is equal among the different color signals.

15. An image input processor according to claim 1, further comprising an input unit having an imaging element for taking an image of an object to produce the color signals, the imaging element including an array of color filters, each color filter allocated to each pixel for the color signal, which is spatially arranged by repeatedly aligning square areas of an jk×jk pixel size where j is the number of the color signals used and k is an integer of two or higher, the square area designed so that the rate of appearance is equal among the different color signals and the number of the appearance of each color signals particularly designated to be larger than two and smaller than j in the horizontal and vertical directions.

16. An image input processor according to claim 1, further comprising an input unit having an imaging element for taking an image of an object to produce the color signals, the imaging element including an array of color filters, each color filter allocated to each pixel for the color signal, which is spatially arranged by repeatedly aligning square areas of an jk×jk pixel size where j is the number of the color signals used and k is an integer of two or higher, the square area designed so that the rate of appearance is equal among the different color signals and that the arrangement of the color filters is defined by a remainder of the distance between a particular point in the square area and an integer coordinate point divided by j.

17. An image signal processor according to claim 1, wherein the restoring unit includes a luminance signal generating unit for generating a luminance signal from each the color signal restored corresponding to the reference image, and a convergence determining unit for repeating a restoring process with the luminance signals through reviewing a profile of the luminance signals.

18. An image signal processor for processing an image signal where each pixel is composed of more than one color signals and at least one of the color signals are dropped out according to the location of the pixel, comprising:

an input unit including an optical lens system where chromatic aberration occurs and an imaging element where the rate of appearance of the color signals is adjusted based on the amount of their chromatic aberration;

an extracting unit for extracting from the image signal produced by the input means color signals of a local area of a predetermined size including a desired pixel;

an approximate reference image generating unit for modifying and combining color signals which have a low degree of the chromatic aberration on the basis of a structure model and an evaluation function to generate an approximate reference image;

a smoothing unit for smoothing the approximate reference image generated by the approximate reference image generating unit in accordance with a degree of the chromatic aberration of a high aberration color signal; and a restoring unit for generating a reference image from the approximate reference image generated by the approximate reference image generating unit and the smoothed approximate reference image generated by the smoothing unit and utilizing it to restore the dropout color signal.

19. An image input processor according to claim 18, wherein the approximate reference image generating unit employs as the structure model a color edge model in which the color signals have a common edge pattern.

20. An image input processor according to claim 18, wherein the approximate reference image generating unit exploits edge intensity calculated by Laplacian operation of each color signal, or energy, entropy, correlation, local uniformity, or moments given from density co-occurrence matrix for the evaluation function.

* * * * *